United States Patent

Kim et al.

[11] Patent Number: 6,043,810
[45] Date of Patent: Mar. 28, 2000

[54] DIGITIZER CONTROLLER

[75] Inventors: Do-youn Kim, Seoul; Byoung-kwon An, Kunpo, both of Rep. of Korea

[73] Assignee: Samsung Electronics, Co., Ltd., Suwon, Rep. of Korea

[21] Appl. No.: 08/981,177

[22] PCT Filed: Jun. 12, 1996

[86] PCT No.: PCT/KR96/00089

§ 371 Date: Dec. 12, 1997

§ 102(e) Date: Dec. 12, 1997

[87] PCT Pub. No.: WO96/42068

PCT Pub. Date: Dec. 27, 1996

[30] Foreign Application Priority Data

| Jun. 12, 1995 | [KR] | Rep. of Korea | 95-15442 |
| Jul. 20, 1995 | [KR] | Rep. of Korea | 95-21316 |
| Dec. 26, 1995 | [KR] | Rep. of Korea | 95-56423 |
| Dec. 30, 1995 | [KR] | Rep. of Korea | 95-69704 |

[51] Int. Cl.[7] ............................................. G09G 5/00
[52] U.S. Cl. .................................................. 345/173
[58] Field of Search .............................. 345/173, 179, 345/180

[56] References Cited

U.S. PATENT DOCUMENTS

| 4,839,634 | 6/1989 | More et al. ........................ 178/18 |
| 4,860,372 | 8/1989 | Kuzunki et al. ................... 178/18 |
| 5,213,381 | 5/1993 | Anderson ........................ 111/292 |
| 5,583,543 | 12/1996 | Takahashi et al. ............. 345/173 |
| 5,643,339 | 7/1997 | Mori et al. .................... 345/173 |
| 5,747,748 | 5/1998 | Zigler .......................... 345/173 |

FOREIGN PATENT DOCUMENTS

| 89118974 | 4/1990 | European Pat. Off. . |
| 90303005 | 10/1991 | European Pat. Off. . |
| 92306151 | 2/1993 | European Pat. Off. . |
| 93108594 | 12/1993 | European Pat. Off. . |

*Primary Examiner*—Richard A. Hjerpe
*Assistant Examiner*—Ronald Laneau
*Attorney, Agent, or Firm*—Marger Johnson & McCollom, P.C.

[57] ABSTRACT

A digitizer controller includes a panel drive signal generator (10), a reference voltage generator (12), a first multiplexer (14) for selectively outputting either a panel drive signal or a reference voltage signal, a 4-channel driving portion (16) for generating a channel driving signal which is provided to each corner of a panel, a third multiplexer (26) for selectively outputting one of the finger touch signals and a stylus signal output from a stylus, a band pass filter, a rectifier (30) for rectifying the output of the band pass filter, a low pass filter (38) for detecting a substantial direct current component from the output of the rectifier (30), an analog-to-digital converter (44) for outputting the output of the low pass filter in synchronization with a panel driving control signal as a coordinates signal, and an interface (46). Therefore, the digitizer controller can be adopted to each of the stylus, finger touch and touch panel type digitizers, and in implementing a semiconductor integrated circuit, reliability is provided and power consumption is lowered.

31 Claims, 22 Drawing Sheets

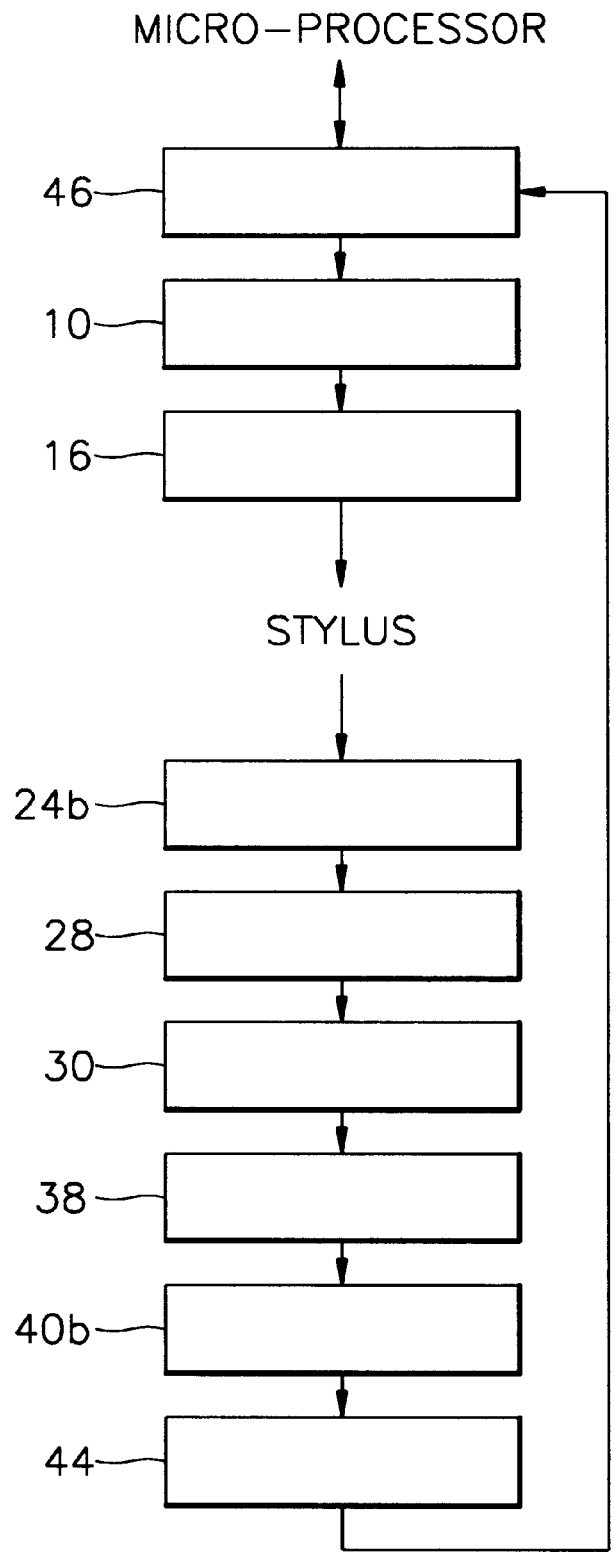

DIGITIZER CONTROLLER

TECHNICAL FIELD

The present invention relates to a digitizer controller, and more particularly, to a digitizer controller which can be implemented in an integrated circuit of a semiconductor device and applied to stylus type, finger touch type and touch panel type digitizers.

BACKGROUND ART

Personal computers, portable transmitters, personal information processor, etc., process text and graphics data using an input apparatus such as a keyboard, a mouse or a digitizer.

The digitizer is for digitally detecting the position of a pen or a finger on a flat panel specifically manufactured to output X and Y coordinates of the position and has merits in that characters and figures both can be input easily and accurately in comparison to a conventional mouse, keyboard or scanner. Further, the digitizer is envisioned to replace the conventional input devices.

The digitizer is classified into three types: a stylus type using a specially devised pen; a finger touch type using a finger; and a touch panel type using a common pen or any pointed object.

The stylus type is widely used in graphics or CAD applications. The finger touch type is used in an apparatus adopting a touch screen display. The touch panel type is used in a personal digital assistance (PDA) or an electronic organizer.

To implement a digitizer system, a tablet for assigning coordinate data, a pointing device such as a stylus, a pen or a finger for locating a position on a coordinate system represented by the tablet, and a digitizer controller for controlling the above elements.

The tablet has a specially manufactured rectangular panel. The panel is coated with a resistive film for the stylus type or the finger touch type or is constituted by two sheets of resistive material separated by a spacer and concurrently arranged to be capable of contact by pressure for the touch panel type.

The location of the pointing device is recognized by the differences in detected signals according to the pressed position when an AC (the stylus and the finger touch types) or DC (the touch panel type) signal is applied at the four corners of the panel. Such a panel and controller are disclosed in U.S. Pat. Nos. 4,600,807, 4,649,232, 4,650,962 and 4,665,283, thus a description thereof will be omitted.

However, since the conventional digitizer controller is specifically designed for only one of the three types described above, it is inconvenient to equip a corresponding digitizer controller according to each type. Also, since the digitizer controller is embodied with discrete circuit elements, the size of the apparatus becomes large and power consumption is high.

DISCLOSURE OF THE INVENTION

To solve the above problems, it is an object of the present invention to provide a digitizer controller which can be adopted for each of the stylus, finger touch and touch panel types.

It is a second object of the present invention to provide an improved driving method in the finger touch type.

It is a third object of the present invention to provide a driving apparatus of the finger touch type befitting the above driving method.

It is a fourth object of the present invention to provide a method of automatically adjusting the band pass filtering characteristics constituting the digitizer controller.

It is a fifth object of the present invention to provide an apparatus for automatically adjusting the band pass filtering characteristics constituting the digitizer controller.

It is a sixth object of the present invention to provide an interfacing portion befitting the digitizer controller.

It is a seventh object of the present invention to provide a generator of a panel driving signal befitting the digitizer controller.

It is an eighth object of the present invention to provide a generator of a panel driving control signal befitting the digitizer controller.

It is a ninth object of the present invention to provide a power saving circuit befitting the digitizer controller.

Accordingly, to achieve the first object there is provided a digitizer controller comprising: a panel drive signal generator for receiving a clock signal having a predetermined first frequency and generating a panel drive signal having a predetermined second frequency and required in the stylus and finger touch modes; a reference voltage generator for generating a reference voltage signal having a predetermined reference level required in a touch panel mode; a first multiplexer for selectively outputting one of the reference voltage signal provided from the reference voltage generator and the panel drive signal provided from the panel drive signal generator in response to a mode selection signal indicating the stylus, finger touch or touch panel mode; a 4-channel driving portion for receiving the output of the first multiplexer and generating a channel driving signal which is provided to each corner of the panel in response to the panel drive control signal according to an operation mode; a current-voltage converter for detecting a change in current in or out of each corner of the panel; a differential amplifier for generating a differential signal of four channels corresponding to the differential component between the output of the current-voltage converter (18) and the channel driving signal provided from the 4-channel driving portion (16) in the finger touch mode; a second multiplexer (22) for sequentially selecting the four-channel differential signal output from the differential amplifier (20) to output the selected signal as a finger touch signal; a third multiplexer (26) for selectively outputting one of the finger touch signal output from the second multiplexer (22) and a stylus signal output from a stylus in response to the mode selection signal; a fourth multiplexer (34) for selectively outputting one of a predetermined reference voltage and the touch panel signal output from the panel (200) in response to the mode selection signal; a band pass filter (28) for filtering the frequency component of the panel drive signal from the output of the third multiplexer (26); a rectifier (30) for rectifying the output of the band pass filter (28); a fifth multiplexer for selectively outputting one of the outputs of the rectifier and the fourth multiplexer in response to the mode selection signal; a low pass filter for detecting a substantial direct current component from the output of the fifth multiplexer; an analog-to-digital converter for converting the output of the low pass filter into a digital signal in synchronization with the panel driving control signal to output as a coordinates signal; and an interface for receiving a control command provided from a microprocessor, generating the mode selection signal indicating the stylus, the finger touch or the touch panel mode by interpreting the received control command and the panel driving control signal corresponding to the selected mode, and transmitting the coordinates signal provided from the analog-to-digital converter to the microprocessor.

It is preferred in the present invention that the differential amplifier is provided with a plurality of channel driving blocks corresponding to the number of the channel driving signals, each amplifying the difference of one of the channel driving signals and one of the current-voltage converted channel driving signals.

It is also preferred in the present invention that the digitizer controller further comprises a preamplifier for amplifying the finger touch signal, the stylus signal and the touch panel signal by a predetermined gain, respectively, to provide to one of the third multiplexer and the fourth multiplexer.

It is also preferred in the present invention that the digitizer controller further comprises: a direct current amplifier having three direct current amplifiers for amplifying the output of the low pass filter at separate gains according to the operation mode; and a sixth multiplexer for selecting one of the outputs of the direct current amplifiers in response to the mode selection signal to provide the selected output to the analog-to-digital converter.

It is also preferred in the present invention that the digitizer controller further comprises a digital-to-analog converter for converting the digital control signal provided from the microprocessor into an analog signal to apply the converted control signal as a frequency characteristic control signal of the band pass filter.

It is also preferred in the present invention that the panel drive signal generator further generates a pilot signal having substantially the same frequency as that of the panel drive signal which is provided to the band pass filter during automatic frequency characteristic control.

It is also preferred in the present invention that the current-voltage converter is configured with variable resistors so that sensitivity of the current-voltage conversion can be adjusted.

It is also preferred in the present invention that the bandwidth of the low pas filter is narrow for removal of noise components and conversion to direct current is easily achieved.

To achieve the second object there is provided a method for driving a panel befitting a finger touch type digitizer comprising the steps of applying channel driving signals having the same potential to each corner of the panel; detecting the change in current generated by the contact of a finger on the panel in or out of each corner of the panel, and converting the detected change in current changing into a change in voltage; detecting differential signals corresponding to the difference of the current-to-voltage converted signal and the channel driving signal; sequentially selecting the differential signals at a predetermined period and time-division multiplexing the selected differential signals; and determining the contact position of the finger according to the size of the multiplex differential signal.

To achieve the third object there is provided a driving apparatus of a finger touch type digitizer comprising: a panel drive signal generator for generating a panel drive signal required in a finger touch mode; a 4-channel driving portion for receiving the panel drive signal and generating a 4-channel driving signal of substantially the same electric potential which is provided to the four corners of a panel; a current-to-voltage converter, interposed between the 4-channel panel driving portion and the panel, for detecting a change in current in or out of each corner of the panel when the finger contacts the panel; a differential amplifier for generating a difference of the 4-channel driving signal and the current-to-voltage conversion value from the current-to-voltage converter; a multiplexer for sequentially selecting the four-channel differential signal of the output from the differential amplifier at a predetermined period to output the selected signal; a band pass filter for detecting a frequency component of the panel drive signal from the output of the multiplexer; a low pass filter for extracting a substantial direct current component from the output of the band pass filter; and an analog-to-digital converter for converting the output of the low pass filter into a digital signal in synchronization with the selected period of the multiplexer.

To achieve the fourth object there is provided a method of adjusting the frequency characteristic of a band pass filter for band-pass-filtering a frequency component of a panel drive signal from a finger touch signal provided from a panel or a stylus signal provided from a stylus in a digitizer controller befitting a stylus type and a finger touch type, the method comprising the steps of: inputting a pilot signal having substantially the same frequency as the panel drive signal to the band pass filter and continuously converting within a predetermined range an adjusting signal for adjusting the frequency characteristic of the band pass filter; comparing the signal from the band pass filter and determining a value of the adjustment signal having the maximum amplitude of the detected signal; and setting a frequency characteristic of the band pass filter according to the determined adjustment signal.

To achieve the fifth object there is provided an apparatus for adjusting the frequency characteristic of a band pass filter for band-pass-filtering a frequency component of a panel drive signal from a finger touch signal provided from a panel or a stylus signal provided from a stylus in a digitizer controller befitting a stylus type and a finger touch type digitizer, the apparatus comprising: a panel drive signal generator for generating a pilot signal having substantially the same frequency as that of a panel drive signal to provide to the band pass filter; a digital-to-analog converter for converting an analog adjustment signal applied from a microprocessor into an digital signal and applying the converted signal as a signal for adjusting the frequency characteristic of the band pass filter; an analog-to-digital converter for detecting the amplitude of a signal from the band pass filter; a microprocessor for generating the adjustment signal changing within a predetermined range to change the frequency characteristic of the band pass filter to provide the generated adjustment signal to the digital-to-analog converter, determining an adjustment signal corresponding to a signal having the maximum amplitude among the band-pass-filtered signals from the changing adjustment signal within the predetermined range, and providing the determined adjustment signal as a frequency characteristic adjustment signal of the band pass filter.

To achieve the sixth object there is provided an interface for transmitting control commands generated from a microprocessor to peripheral devices and controlling the transmission of the data provided from the peripheral devices to the microprocessor, the interface comprising: a data latch for latching the control command provided from the microprocessor; a data buffer for inputting the data provided from the peripheral devices and outputting the input data to the microprocessor; a command decoder for receiving the control command provided from the data latch and generating various control signals necessary for control of the peripheral devices; and an address decoder for receiving an address signal provided from the microprocessor and generating signals for activating the data latch and the data buffer.

To achieve the seventh object there is provided a digitizer controller in which the panel drive signal generator comprises: a D flip-flop for receiving a clock signal and generating a (n−1)th signal divided by n, wherein n is an integer, and wherein the (n−1) divided signal is generated, each being synchronized from the first clock signal to the (n−1)th clock signal in a sequential clock signal string of the corresponding number to division ratio n; a ladder portion for generating a pseudo sinusoidal signal by weight-calculating the (n−1) division signals according to a predetermined resistance value; and a band pass filter for generating the panel drive signal which is a substantial sine wave by band-pass-filtering the pseudo sinusoidal signal provided from the ladder portion.

To achieve the eighth object there is provided a digitizer controller in which the panel driving control signal generator comprises: a first counter for generating a first count signal by counting the clock signal at a predetermined first counting ratio; a second counter for binary-counting the first count signal provided from the first counter to output the binary-counted signal as a second signal; an inverting portion having two inverters for respectively inverting the first and second count signals each provided from the first and second counters; an OR gate for OR-ing the first and second count signals; and a signal selecting portion for receiving the first and second count signals respectively provided from the first and second counters, the inverted first and second count signals provided from the inverting portion and a signal output from the OR gate and generating a panel driving control signal corresponding to each mode in response to the mode selection signal, wherein the signal selecting portion outputs the first and second count signals respectively provided from the first and second counters, the inverted first and second count signals provided from the inverting portion and a signal output from the OR gate in the stylus and the touch panel modes and the signal provided from the OR gate in the finger touch mode.

To achieve the ninth object there is provided a digitizer controller further comprising: a counting portion for counting the clock signal having a predetermined period at a predetermined first count ratio to output a first pulse signal; a counter for counting the first pulse signal output from the counting portion at a predetermined second count ratio, by starting the counting operation according to a tip signal of the stylus; and a power slip signal generator for determining whether the idle status of the stylus continues over a predetermined time period by AND-ing a second pulse signal output from the counter and the tip signal of the stylus and generating a power slip signal for controlling power consumption if the idle status continues over the predetermined time period, wherein the interface enters a power saving mode in response to the power slip signal provided from the power slip signal generator.

BRIEF DESCRIPTION OF THE DRAWINGS

FIG. 3 is a diagram schematically illustrating the signal flow in the digitizer controller shown in FIG. 1 in the stylus mode;

BEST MODE FOR CARRYING OUT THE INVENTION

Figure 1:
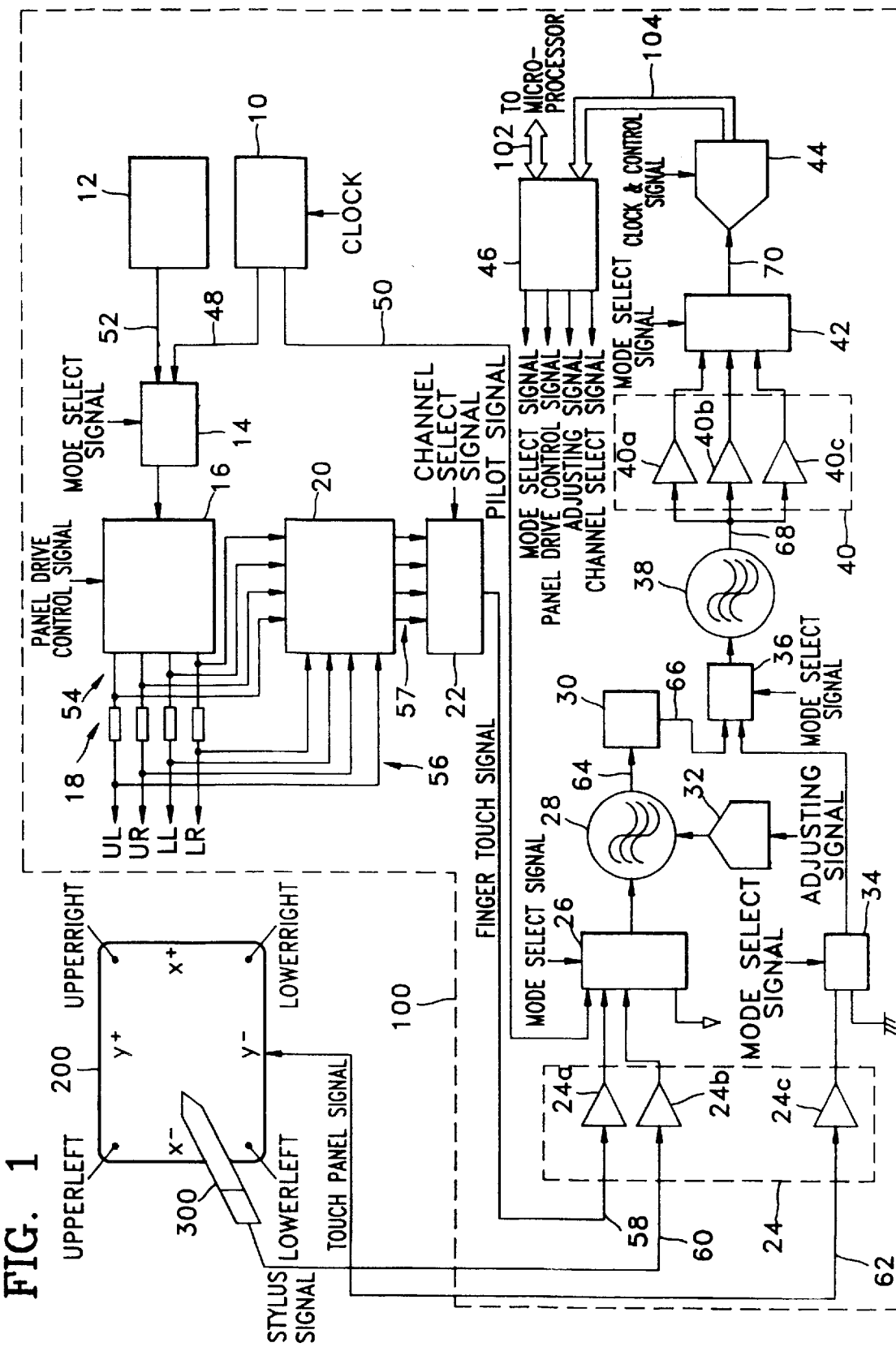
FIG. 1 is a schematic diagram of a digitizer controller according to a preferred embodiment of the present invention.

FIG. 1 is a diagram of a digitizer controller according to a preferred embodiment of the present invention. In FIG. 1, reference numeral 100 represents a digitizer controller according to the present invention, reference numeral 200 represents a panel, and reference numeral 300 represents a stylus.

The digitizer controller 100 includes a panel drive signal generator 10, a reference voltage generator 12, a first multiplexer (MUX) 14, a four-channel panel driver 16, a current-to-voltage converter 18, a differential amplifier 20, a second multiplexer 22, a preamplifier 24, a third multiplexer 26, a band pass filter (BPF) 28, a rectifier 30, a digital-to-analog (D/A) converter 32, a fourth multiplexer 34, a fifth multiplexer 36, a low pass filter (LPF) 38, a direct current (DC) amplifier 40, a sixth multiplexer 42, an analog-to-digital converter (A/D) 44, and an interface portion 46.

The panel drive signal generator 10 generates a predetermined panel drive signal 48 of a second frequency for driving a panel 200 in a stylus or finger touch mode and a pilot signal 50 for adjusting frequency characteristics of the BPF 28, using a clock of a predetermined first frequency signal applied thereto. Here, in the stylus mode the digitizer controller 100 operates so that it is suited to a stylus type, and in the finger touch mode the digitizer controller 100 operates so that it is suited to a finger touch type. Preferably, the panel drive signal 48 and the pilot signal 50 are sinusoidal having a predetermined period.

The reference voltage generator 12 generates a reference voltage signal 52 for driving the panel 200 on the touch panel mode. Here, in the touch panel mode the digitizer controller 100 operates so that it is suited to a touch panel type. Here, the reference voltage signal 52 is a DC signal with a first reference voltage of a predetermined value.

The first multiplexer 14 selectively outputs the panel driving signal 48 provide from the panel drive signal generator 10 and the reference voltage signal 52 provided from the reference voltage generator 12 according to a mode select signal applied thereto.

The four-channel panel driver 16 receives the channel drive signal 48 or the reference signal 52 output from the first multiplexer 14 and generates channel driving signals UL, UR, LL and LR which are suitable for the stylus mode, finger touch mode and touch channel mode in response to panel drive control signals C_UL, C_UR, C_LL and C_LR applied thereto. Here, the channel drive signals UL, UR, LL and LR for the first to the fourth channels are provided to the upper left, upper right, lower left and lower right corners of the panel 200, respectively.

The current-to-voltage converter 18 includes current-to-voltage converting portions (generally, resistors) each applied to the four channel drive signals UL, UR, LL and LR, which detect the change in current input to or output from each corner of the panel 200 in the touch panel mode.

The differential amplifier 20 outputs signals DIFF_UR, DIFF_UL, DIFF_LR and DIFF_LL corresponding to each difference between the channel drive signals UL, UR, LL and LR and current-to-voltage-converted signals UL', UR', LL' and LR' output from the current-to-voltage converter 18. That is, the signals DIFF_UR, DIFF_UL, DIFF_LR and DIFF_LL each have an amplitude corresponding to the difference each between UR and UR', UL and UL', LR and LR', and LL and LL'.

The second multiplexer 22 selectively outputs one of the signals DIFF_UR, DIFF_UL, DIFF_LR and DIFF_LL provided from the differential amplifier 20 according to a channel select signal applied thereto. That is, the second multiplexer 22 outputs the signals DIFF_UR, DIFF_UL, DIFF_LR and DIFF_LL for time segments T1, T2, T3 and T4, respectively.

The signal (finger touch signal 58) output from the second multiplexer 22, the signal (touch panel signal 62) output from the panel 200, and the signal (stylus signal 60) output from the stylus 300 are provided to the preamplifier 24.

The preamplifier 24 includes three sub-preamplifiers 24a, 24b and 24c each of which amplify the finger touch signal 58, stylus signal 60 and touch panel signal 62 with different gains, respectively.

The finger touch signal 58 amplified by the first sub-preamplifier 24a and the stylus signal 60 amplified by the second sub-preamplifier 24b are provided to the third multiplexer 26, and the touch panel signal 62 amplified by the third sub-preamplifier 24c is provided to the fourth multiplexer 34.

The third multiplexer 26 selectively outputs one of the pilot signal 50 output from the panel drive signal generator 10 and finger touch signal 58 output from the panel 200 and stylus signal 60 output from the stylus 300 according to the mode select signal applied thereto.

The BPF 28 band-pass filters the sequence component of the panel drive signal from the output of the third multiplexer 26 to remove undesirable noise.

A filtered signal 64 output from the BPF 28 is rectified by the rectifier 30 and then provided as an input to the fifth multiplex 36.

The fourth multiplexer 34 selectively outputs a predetermined reference voltage (ground voltage) or the amplified touch panel signal 62 according to the mode select signal applied thereto and provides the selected signal as the other input to the fifth multiplexer 36.

The fifth multiplexer 36 selectively outputs a signal 66 output from the rectifier 30 or a signal output from the fourth multiplexer 34 according to the mode select signal applied thereto.

The LPF 38 low-pass filters the signal output from the fifth multiplexer 36 for making the signal into a direct current (DC) and outputs the result to the DC amplifier 40. Here, preferably, the bandwidth of the LPF 38 is narrow. If the band width is wide, many alternating current (AC) components are output, thereby destabilizing the output value. Thus, the AC components should be removed by narrowing the bandwidth as much as possible.

The DC amplifier 40 includes three sub-DC amplifiers 40a, 40b and 40c which are applied to the finger touch mode, stylus mode and touch panel mode, respectively. Each sub-DC amplifier amplifies the signal output from the LPF 38 and outputs the amplified signal. Here, since different gains are required in each mode, the proper sub-DC amplifier should be selected according to each mode.

The sixth multiplexer 42 selectively outputs one of the signals output from the sub-DC amplifiers 40a, 40b and 40c to the AID converter 44 according to the mode select signal applied thereto.

The A/D converter 44 converts the analog signal 70 output from the sixth multiplexer 42 into a digital signal according to a clock signal and control signal applied thereto and outputs the converted digital signal to the interface portion 46.

The interface portion 46 controls the above-described constituent elements according to a control signal provided from a microprocessor (not shown) and transmits the digital signal converted by the A/D converter 44 to the microprocessor.

The digital signal transmitted to the microprocessor is a digital coordinate signal with respect to the stylus, pen and finger from the panel 200.

The operation of the digitizer controller shown in FIG. 1 in the stylus mode, finger touch mode and touch panel mode will be described as follows.

First, the operation of the four-channel panel driver 16 shown in FIG. 1 in the stylus mode will be described with reference to FIGS. 2A and 2B which are diagrams showing waveforms of the panel drive control signals C_UL, C_LL, C_UR and C_LR, and channel drive signals UL, LL, UR and LR, respectively.

Figure 2A:
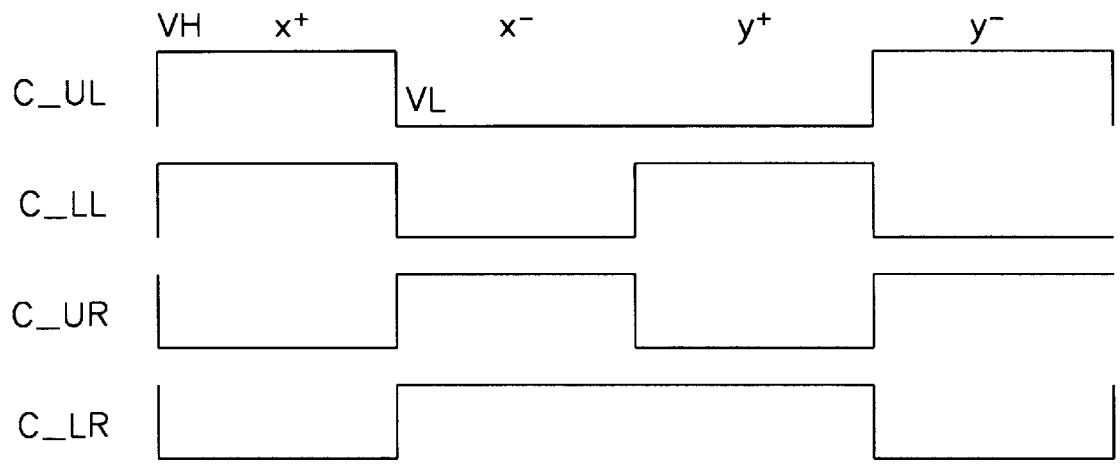
FIGS. 2A and 2B show the waveforms of the panel drive control signals and channel drive signals, respectively, illustrating the operation of the digitizer controller shown in FIG. 1 in a stylus mode.
Figure 2B:
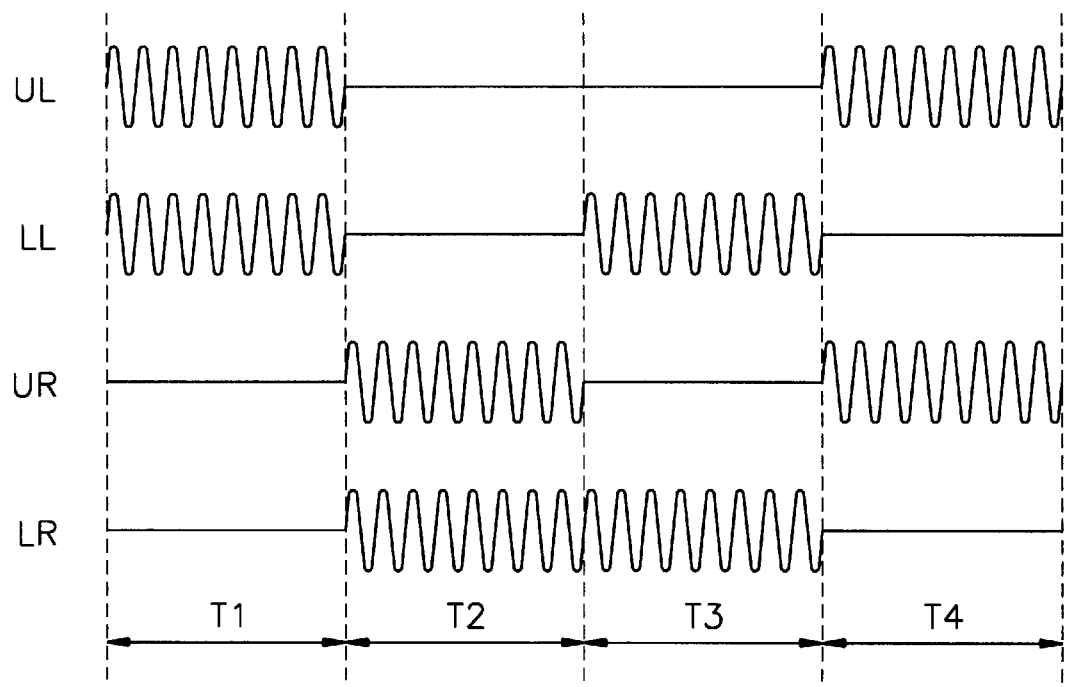

The panel drive control signals C_UL, C_LL, C_UR and C_LR shown in FIG. 2A are digital signals. Here, high levels (VH) of these signals indicate that the channel drive signals UL, LL, UR and LR are applied to each corner of the panel 200, and low levels (VL) indicate that a predetermined DC voltage (preferably, ground) is applied to each corner of the panel 200. Also, the panel drive control signals C_UL, C_LL, C_UR and C_LR shown from top to bottom of FIG. 2A, respectively, correspond to the channel drive signals UL, LL, UR and LR shown from top to bottom of FIG. 2B, respectively.

In order to recognize one set of coordinates where the stylus is located, the four corners of the panel 200 are driven four times in pairs of two corners per drive. Here, the left and right corners are driven prior to the upper and lower corners. For example, when the channel drive signals UL and LL are applied to the upper left and lower left corners of the panel 200 and a ground potential is applied to the remaining corners as shown in interval T1, the amplitude of the signal detected by the stylus moving on the panel 200 corresponds to a distance $x^+$ from the right edge of the panel to the position of the stylus. Also, when the channel drive signals UR and LR are applied to the upper right and lower right corners of the panel 200 and ground is applied to the remaining corners as shown in interval T2, the amplitude of the signal detected by the stylus corresponds to a distance $x^-$ from the left edge of the panel to the position of the stylus.

That is, the x-coordinate is determined as a relative coordinate by the following formula (1).

$$x = \frac{x^+ - x^-}{x^+ + x^-} \quad (1)$$

The amplitude of the signal in interval T1 corresponds to $x^+$ and the amplitude of the signal in interval T2 corresponds to $x^-$, respectively. Thus, the x-coordinate is recognized by the amplitude ratio between $x^+$ and $x^-$. In the same manner, $y^+$ and $y^-$ are detected in interval T3 and T4, and then y-coordinate is recognized by the amplitude ratio between $y^+$ and $y^-$. That is, the y-coordinate is determined as a relative coordinate by the following formula (2).

$$y = \frac{y^+ - y^-}{y^+ + y^-} \quad (2)$$

This method for determining the x- and y-coordinates is disclosed in U.S. Pat. Nos. 4,600,807, 4,649,232, 4,650,962 and 4,665,283.

In the stylus mode, the mode select signal represents the stylus mode. As a result, the first multiplexer 14 selectively outputs the panel drive signal 48 output from the panel drive signal generator 10, the third multiplexer 26 selectively outputs the stylus signal 60 output from the second sub-preamplifier 24b, the fifth multiplexer 36 selectively output the signal 66 output from the rectifier 30, and the sixth multiplexer 42 selectively outputs the signal output from the second sub-DC amplifier 40b.

FIG. 3 illustrates the signal flow in the stylus mode. Here, the interface portion 46 generates a mode select signal, a panel drive control signal, an adjusting signal and a channel select signal under the control of the microprocessor. The panel drive signal 48 output from the panel drive signal generator 10 is provided to the four-channel panel driver 16 via the first multiplexer 14. The four-channel panel driver 16 generates the channel drive signals UL, LL, UR and LR shown in FIG. 2B in accordance with the panel drive control signals C_UL, C_LL, C_UR and C_LR shown in FIG. 2A and outputs the generated signals to each corner of the panel 200. The stylus signal detected by the stylus 300 from the panel 200 is provided to the second sub-preamplifier 24b. The pre-amplified stylus signal 60 output from the second sub-preamplifier 24b is provided to the BPF 28 via the third multiplexer 26. The BPF 28 extracts a component having the frequency of the panel drive signal as a main frequency from the stylus signal 60 and outputs the extracted signal to the rectifier 30, and then the rectifier 30 rectifies the extracted signal and then output the rectified signal. The signal 66 output from the rectifier 30 is provided to the LPF 38 via the fifth multiplexer 36. The LPF 38 low-pass filters the signal 66 output from the rectifier 30 and outputs the result to the second sub-DC amplifier 40b. The second sub-DC amplifier 40b amplifies the signal 68 output from the LPF 38 and outputs the amplified signal to the A/D converter 44 via the sixth multiplexer 42. The A/D converter 44 converts the signal 70 output from the sixth multiplexer 42 into a digital signal and then the digital signal is output to the interface portion 46 via a data bus 104. Here, the converted digital signal is a signal which represents the amplitude of the signal detected by the stylus distances $x^+$, $x^-$, $y^+$ and $y^-$ from the location of stylus to each side of the panel 200 in interval T1, T2, T3 and T4. The interface portion 46 provides the coordinate signal output from the A/D converter 44 via a bus 102 to the microprocessor.

Figure 4A:
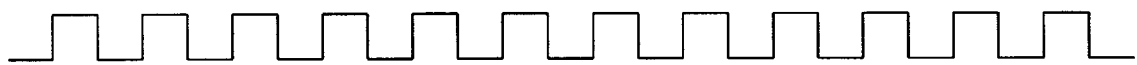
FIGS. 4A through 4E are waveforms illustrating the operation of each constituent element of the digitizer controller show in FIG. 1 in the stylus mode.
Figure 4B:
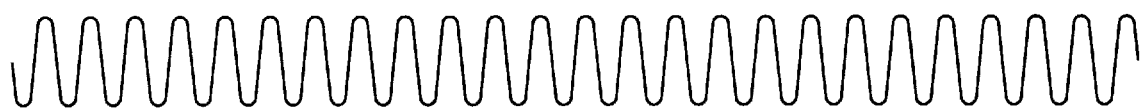
Figure 4C:
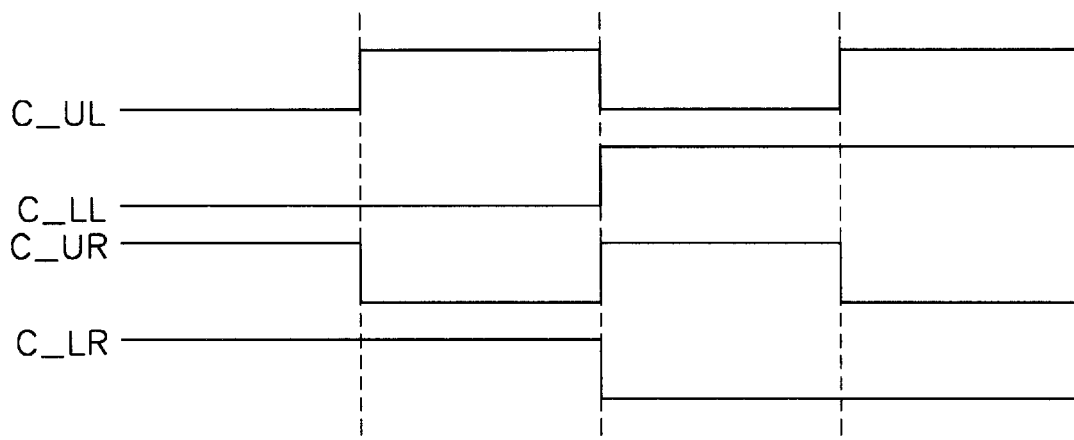
Figure 4D:
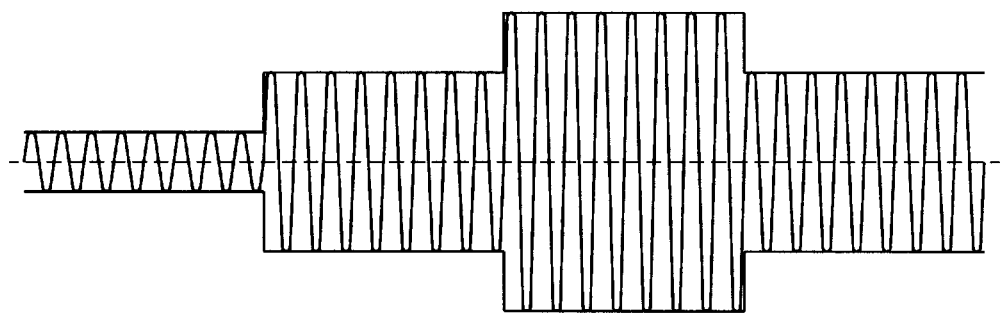
Figure 4E:
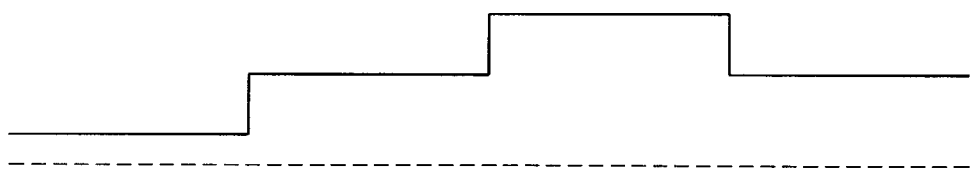

FIGS. 4A through 4E are waveforms illustrating the operation of each constituent element of the digitizer controller shown in FIG. 1 in the stylus mode. More specifically, FIG. 4A is a waveform of the clock signal input to the panel drive signal generator 10, FIG. 4B is a waveform of the panel drive signal 48 generated by the panel drive signal generator 10 using the clock signal shown in FIG. 4A, FIG. 4C are waveforms of the panel drive control signals C_UL, C_LL, C_UR and C_LR applied to the four-channel panel driver 16, FIG. 4D shows an example of the waveform of the stylus signal 60 at a point detected by the stylus, and FIG. 4E is a waveform of the signal 68 output from the LPF 38.

Next, the operation of the digitizer controller according to the present invention in the finger touch mode will be described.

According to a preferred embodiment, the driving method of the digitizer controller in the finger touch mode is different from that of the conventional digitizer controller. According to the conventional driving method, four corners of the panel are driven one at a time. Also, in the stylus mode or the touch panel mode, while two corners of the panel are driven simultaneously in the digitizer controller of the present invention, the channel drive signal is applied to only one corner in the conventional digitizer controller, so that less current is detected. Accordingly, the sensitivity of the differential amplifier should be increased.

In the driving method of the present invention, the channel drive signals UL, LL, UR and LR each having the same amplitude are simultaneously applied to four corners of the panel and the change in current detected by each channel is detected in sequence, thereby improving the sensitivity of the digitizer controller of the present invention.

The operation of the digitizer controller in the finger touch mode will be described in detail with reference to FIGS. 5A, 5B and 6A–6C.

Figure 5A:
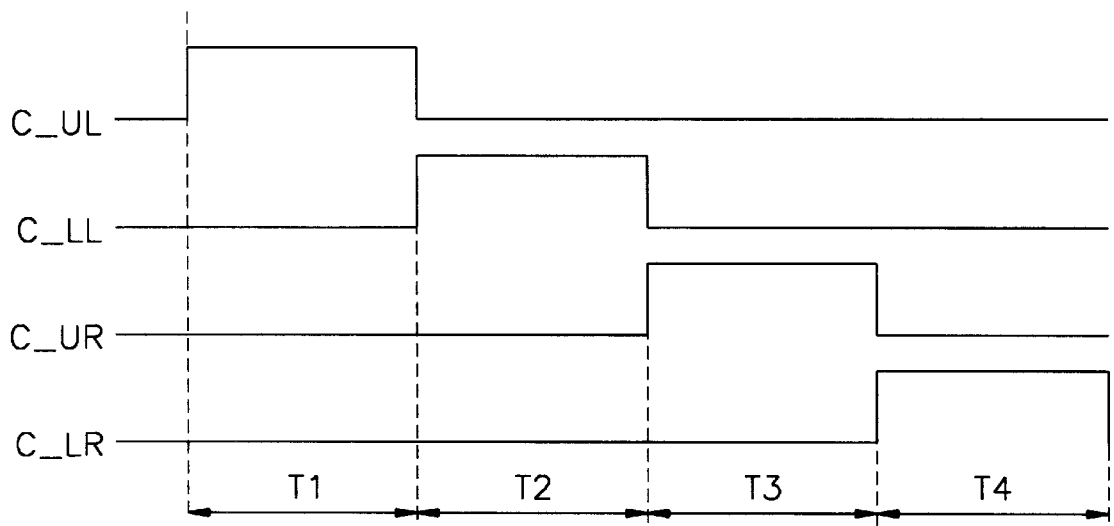
FIGS. 5A and 5B show the waveforms of the panel drive control signals and channel drive signals, respectively, in the operation of a conventional digitizer controller of a finger touch mode.
Figure 5B:
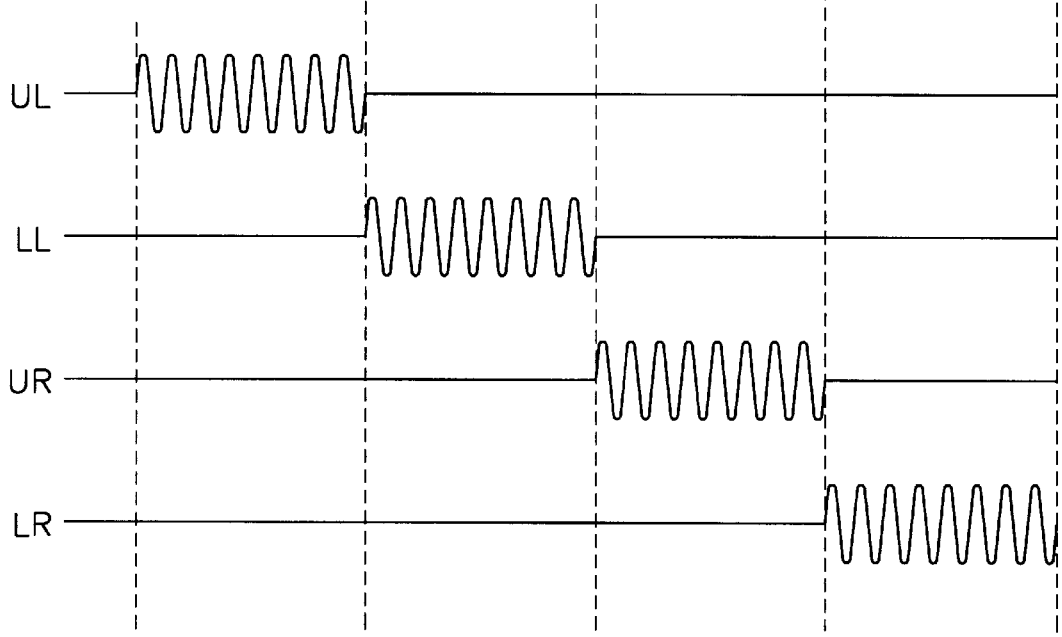

FIG. 5A shows waveforms of the panel drive control signals C_UL, C_LL, C_UR and C_LR of the conventional digitizer controller in the finger touch mode. As shown in FIG. 5A, only one corner of the panel is driven in each of sections T1, T2, T3 and T4 when a change in the current in each channel is detected. FIG. 5B shows waveforms of the channel drive signals UL, LL, UR and LR generated in accordance with the panel drive control signals C_UL, C_LL, C_UR and C_LR shown in FIG. 5A.

Figure 6A:
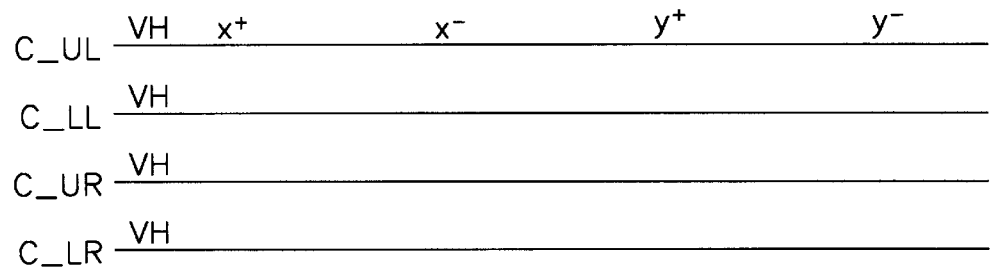
FIGS. 6A and 6C are graphs showing the waveforms of the panel drive control signals and channel drive signals, respectively, in the operation of the digitizer controller of the present invention shown in FIG. 1 in a finger touch mode.
Figure 6B:
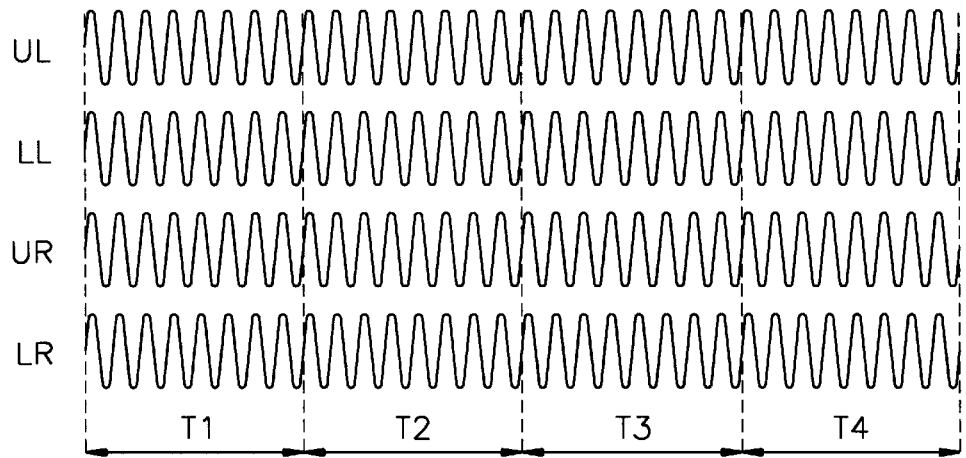
Figure 6C:
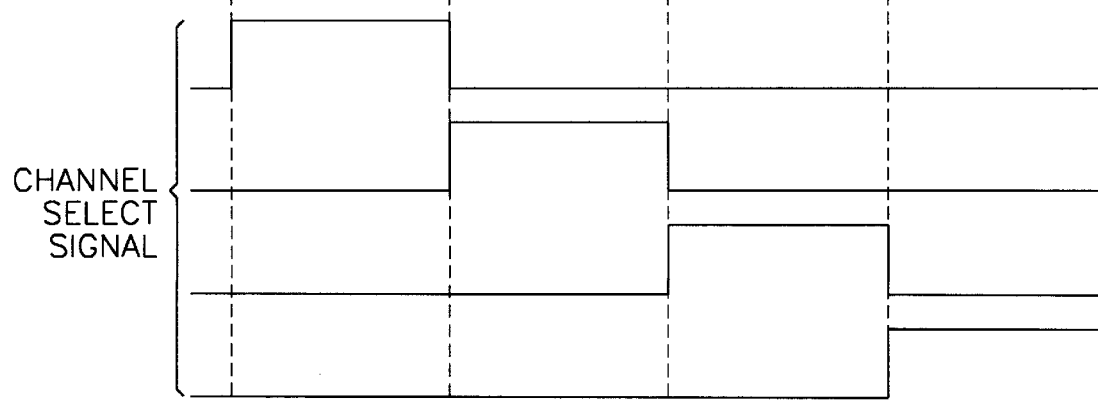

FIGS. 6A through 6C illustrate the driving method of the digitizer controller according to the present invention in the finger touch mode. FIG. 6A shows waveforms of the panel drive control signals C_UL, C_LL, C_UR and C_LR in the finger touch mode according to the driving method of the present digitizer controller.

As shown in FIG. 6A, the four corners of the panel are all driven in sections T1, T2, T3 and T4 when a change in current in each channel is detected. Accordingly, the change in current in each channel is increased, thereby improving the sensitivity. FIG. 6B shows waveforms of the channel drive signals UL, LL, UR and LR generated in accordance with the panel drive control signals C_UL, C_LL, C_UR and C_LR shown in FIG. 6A, and FIG. 6C shows waveforms of the channel select signal. Here, a change current in each channel is detected in sections T1, T2, T3 and T4 one at a time according to the channel select signal.

The driving method of the digitizer controller in the finger touch mode according to the present invention is as follows.

First, the channel drive signals UL, LL, UR and LR each having an AC component with the same potential are simultaneously applied to all four corners of the panel.

Second, the change in current which is generated by the contact of a finger on the panel and input to/output from each corner of the panel is detected and then converted into a change in voltage.

Third, differential signals which correspond to the amplitude difference between the channel drive signals UL, LL UR and LR, and the current-to-voltage-converted signals are detected.

Fourth, the differential signals are repeatedly selected with a predetermined period in sequence and then a time division multiplexing is performed with respect to the selected signals.

Finally, the position of the finger on the panel 200 is determined on the basis of the amplitude of the multiplexed difference signal.

In the finger touch mode, the channel drive signals UL, LL, UR and LR each having the same phase and amplitude are applied to all four corners of the panel 200. When a finger touches the panel, the current input to/output from each corner of the panel 200 is changed according to the position of the finger on the panel 200 since the finger functions as a capacitor located between the ground and the panel. Then, the current-to-voltage converter 18 converts the change in current into a change in voltage, and outputs the result.

In the finger touch mode, the mode select signal represents the finger touch mode. Accordingly, the first multiplexer 14 selectively outputs the panel drive signal 48 output from the panel drive signal generator 10, the second multiplexer 22 selectively outputs the differential signals selected in sequence, the third multiplexer 26 selectively outputs the finger touch signal 58 output from the first sub-preamplifier 24a, the fifth multiplexer 36 selectively outputs the signal 66 output from the rectifier 30, and the sixth multiplexer 42 selectively outputs the signal output from the first sub-DC amplifier 40a.

Figure 7:
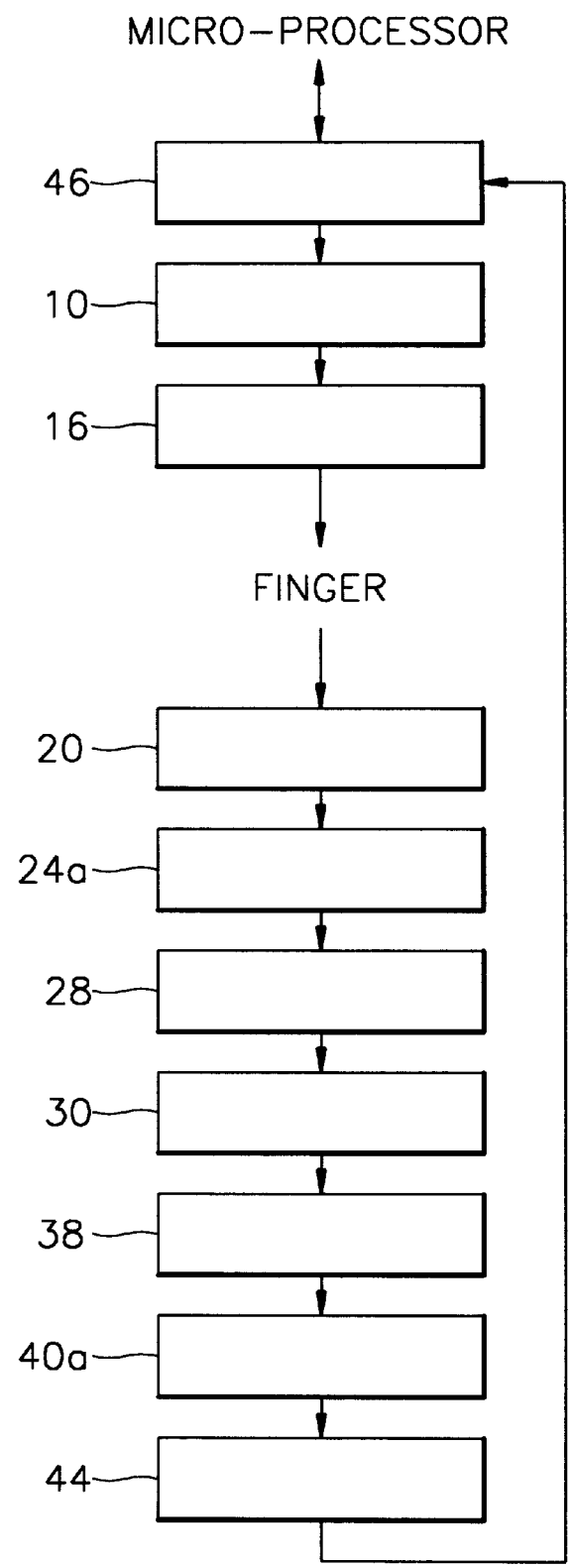
FIG. 7 is a diagram schematically illustrating the signal flow in the digitizer controller shown in FIG. 1 in the finger touch mode.

FIG. 7 shows the signal flow in the finger touch mode.

The interface portion 46 generates a mode select signal, a panel drive control signal, an adjusting signal and a channel select signal under the control of the microprocessor.

The panel drive signal 48 output from the panel drive signal generator 10 is provided to the four-channel panel driver 16 via the first multiplexer 14.

The four-channel panel driver 16 generates the channel drive signals UL, LL, UR and LR shown in FIG. 6B in accordance with the panel drive control signals C_UL, C_LL, C_UR and C_LR shown in FIG. 6A and outputs the generated signals to each corner of the panel 200.

The current-to-voltage-converted channel drive signals UL', LL', UR' and LR', which change according to the position of the finger on the panel 200, are provided to the differential amplifier 20, and the differential signals output from the differential amplifier 20 are selected by the second multiplexer 22 in sequence. Then, the selected signal is provided to the first sub-preamplifier 24a as the finger touch signal 58.

The finger touch signal pre-amplified by the first sub-preamplifier 24a is provided to the BPF 28 via the third multiplexer 26.

The BPF 28 extracts a component having the frequency of the panel drive signal 48 as a main frequency from the finger touch signal 58 and outputs the extracted signal to the rectifier 30, and then the rectifier 30 rectifies the extracted signal and then outputs the rectified signal.

The signal 66 output from the rectifier 30 is provided to the LPF 38 via the fifth multiplexer 36.

The LPF 38 low pass filters the signal 66 output from the rectifier 30 and outputs the result to the first sub-DC amplifier 40a.

The first sub-DC amplifier 40a amplifies the signal 68 output from the LPF 38 and outputs the amplified signal to the A/D converter 44 via the sixth multiplexer 42.

The A/D converter 44 converts the signal 70 output from the sixth multiplexer 42 into a digital signal and then the digital signal is output to the interface portion 46 via the data bus 104.

The interface portion 46 provides the coordinate signal output from the A/D converter 44 via the bus 102 to the microprocessor.

Figure 8A:
FIGS. 8A through 8E show the waveforms in the operation of each constituent element of the digitizer controller shown in FIG. 1 in the finger touch mode.
Figure 8B:
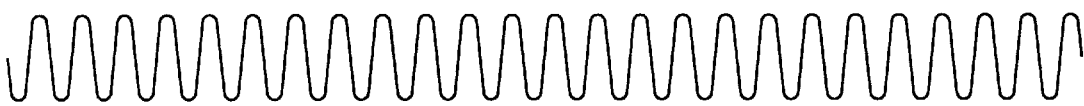
Figure 8C:
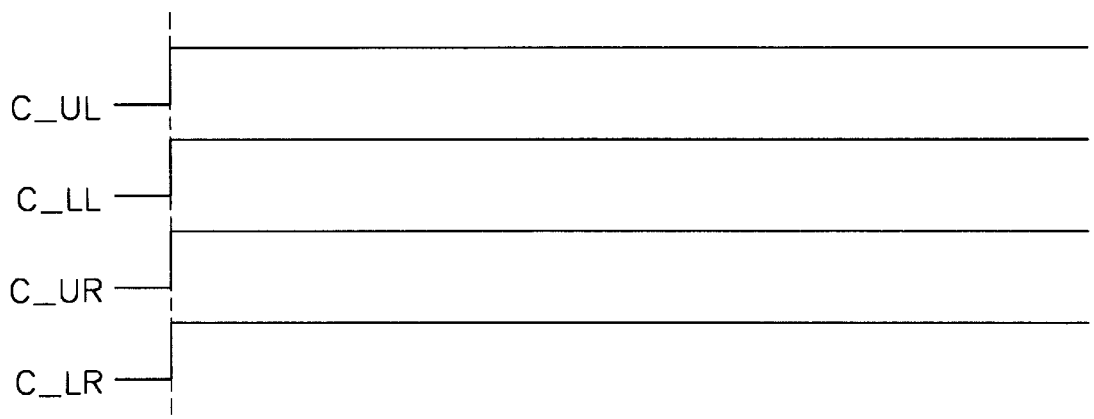
Figure 8D:
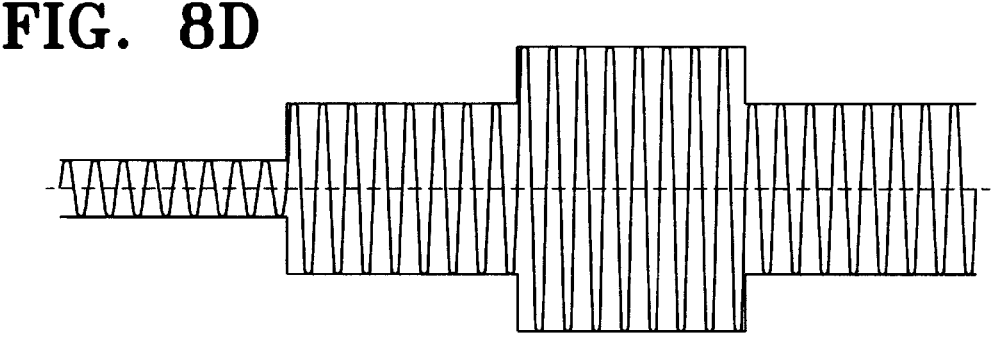
Figure 8E:
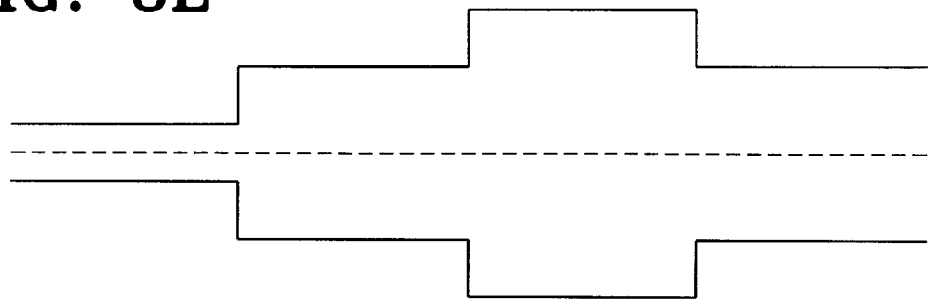

FIGS. 8A through 8E are waveforms illustrating the operation of each constituent element of the digitizer controller show in FIG. 1 in the finger touch mode. More specifically, FIG. 8A is a waveform of the clock signal input to the panel drive signal generator 10, FIG. 8B is a waveform of the panel drive signal 48 generated by the panel drive signal generator 10 using the clock signal shown in FIG. 8A, FIG. 8C are waveforms of the panel drive control signals C_UL, C_LL, C_UR and C_LR applied to the four-channel panel driver 16, FIG. 8D shows an example of the waveform of the finger touch signal output from the second multiplexer 22, and FIG. 8E is a waveform of the signal 68 output from the LPF 38.

Figure 9A:
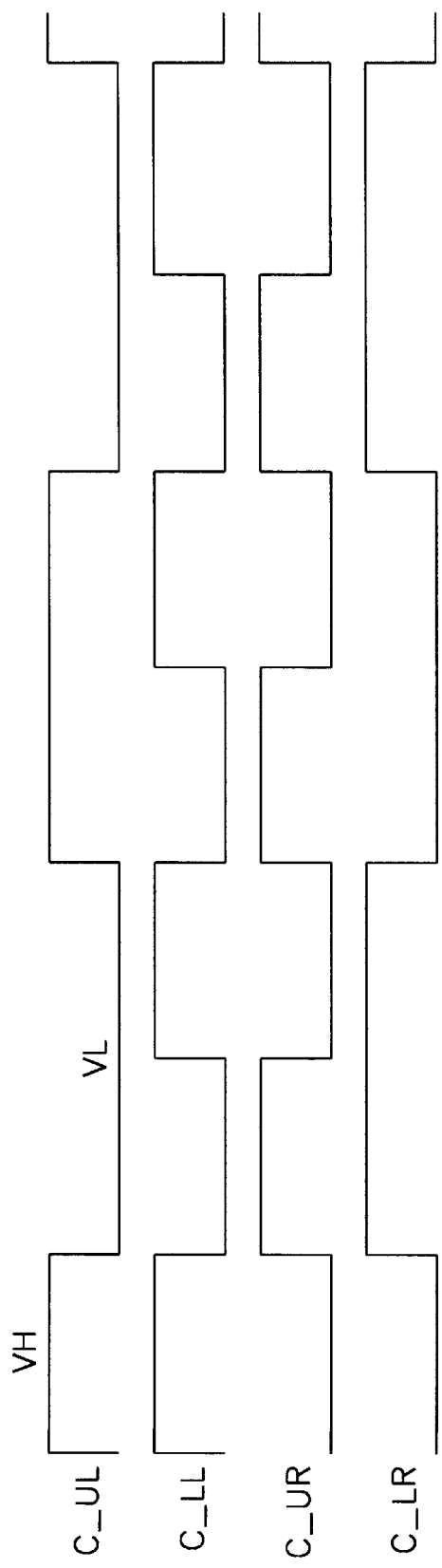
FIGS. 9A and 9B show the waveforms of the panel drive control signals and channel drive signals, respectively, in the operation of the digitizer controller shown in FIG. 1 in a touch panel mode.
Figure 9B:
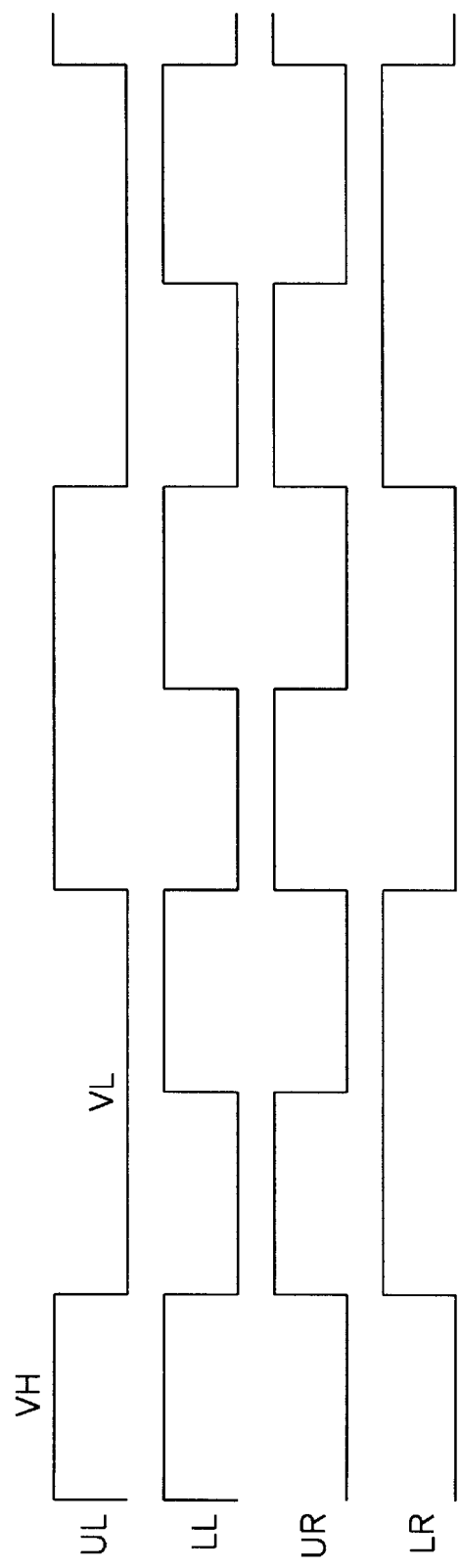

Next, the operation of the four-channel panel driver 16 shown in FIG. 1 in the touch panel mode will be described with reference to FIGS. 9A and 9B, wherein FIG. 9A are waveforms of the panel drive control signals C_UL, C_LL, C_UR and C_LR and FIG. 9B are waveforms of the channel drive signals UL, LL, UR and LR, respectively.

In the touch panel mode, all four corners of the panel 200 are driven by a DC signal differently from the stylus mode. However, the panel drive control signals C_UL, C_LL, C_UR and C_LR in the touch panel mode are the same as those in the stylus mode. A signal generated by the touch of a pen on the panel 200 is detected by the panel 200. In the same manner as the stylus mode, the x-coordinate of the position of the pen is recognized in sections T1 and T2, and the y-coordinate of the position of the pen is recognized in sections T3 and T4, respectively. A reference voltage signal required for the touch panel mode is provided from the reference voltage generator 12.

In the touch panel mode, the mode select signal represents the touch panel mode. Accordingly, the first multiplexer 14 selectively outputs the reference voltage signal output from the reference voltage generator 12, the fourth multiplexer 34 selectively outputs the pre-amplified touch panel signal output from the third sub-preamplifier 24c, the fifth multiplexer 36 selectively outputs the signal output from the fourth multiplexer 34, and the sixth multiplexer 42 selectively outputs the signal output from the third sub-DC amplifier 40c.

Figure 10:
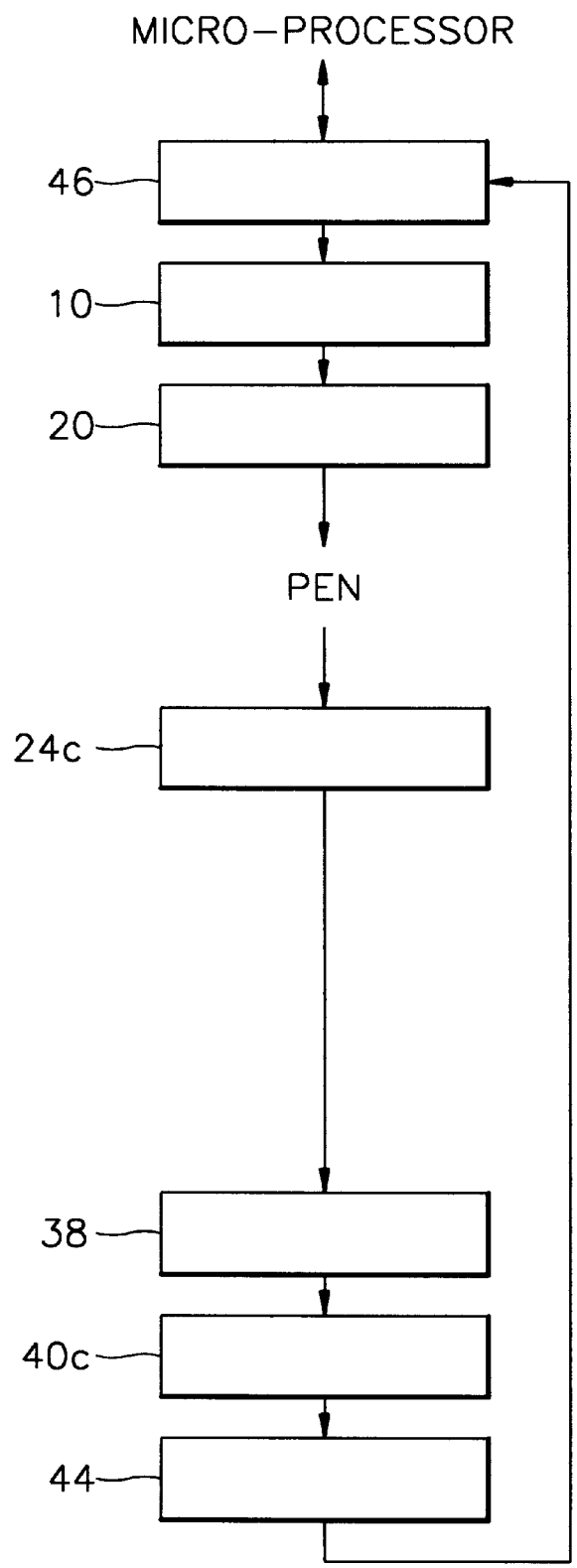
FIG. 10 is a diagram schematically illustrating the signal flow in the digitizer controller shown in FIG. 1 in the touch panel mode.

FIG. 10 schematically shows the signal flow in the touch panel mode.

The interface portion 46 generates a mode select signal, a panel drive control signal, an adjusting signal and a channel select signal under the control of the microprocessor.

The reference voltage signal generated from the reference voltage generator 12 is provided via the first multiplexer 14 to the four-channel panel driver 16.

The four-channel panel driver 16 generates the channel drive signals UL, LL, UR and LR shown in FIG. 9B in accordance with the panel drive control signals C_UL, C_LL, C_UR and C_LR shown in FIG. 9A and outputs the generated signals to each corner of the panel 200.

The touch panel signal 62 detected by the panel according to the location of the pen (not shown) moving on the panel 200 is provided to the third sub-preamplifier 24c.

The touch panel signal 62 pre-amplified by the third sub-preamplifier 24c is provided to the LPF 38 via the fifth multiplexer 36. Then, the third sub-DC amplifier 40c amplifies the signal 68 provided from the LPF 38 and provides the amplified signal to the A/D converter 44 via the sixth multiplexer 42.

The A/D converter 44 converts the signal 70 output from the sixth multiplexer 42 into a digital signal and then the digital signal is output to the interface portion 46. The interface portion 46 provides the coordinate signal output from the A/D converter 44 to the microprocessor.

Figures 11A, 11B, 11C:
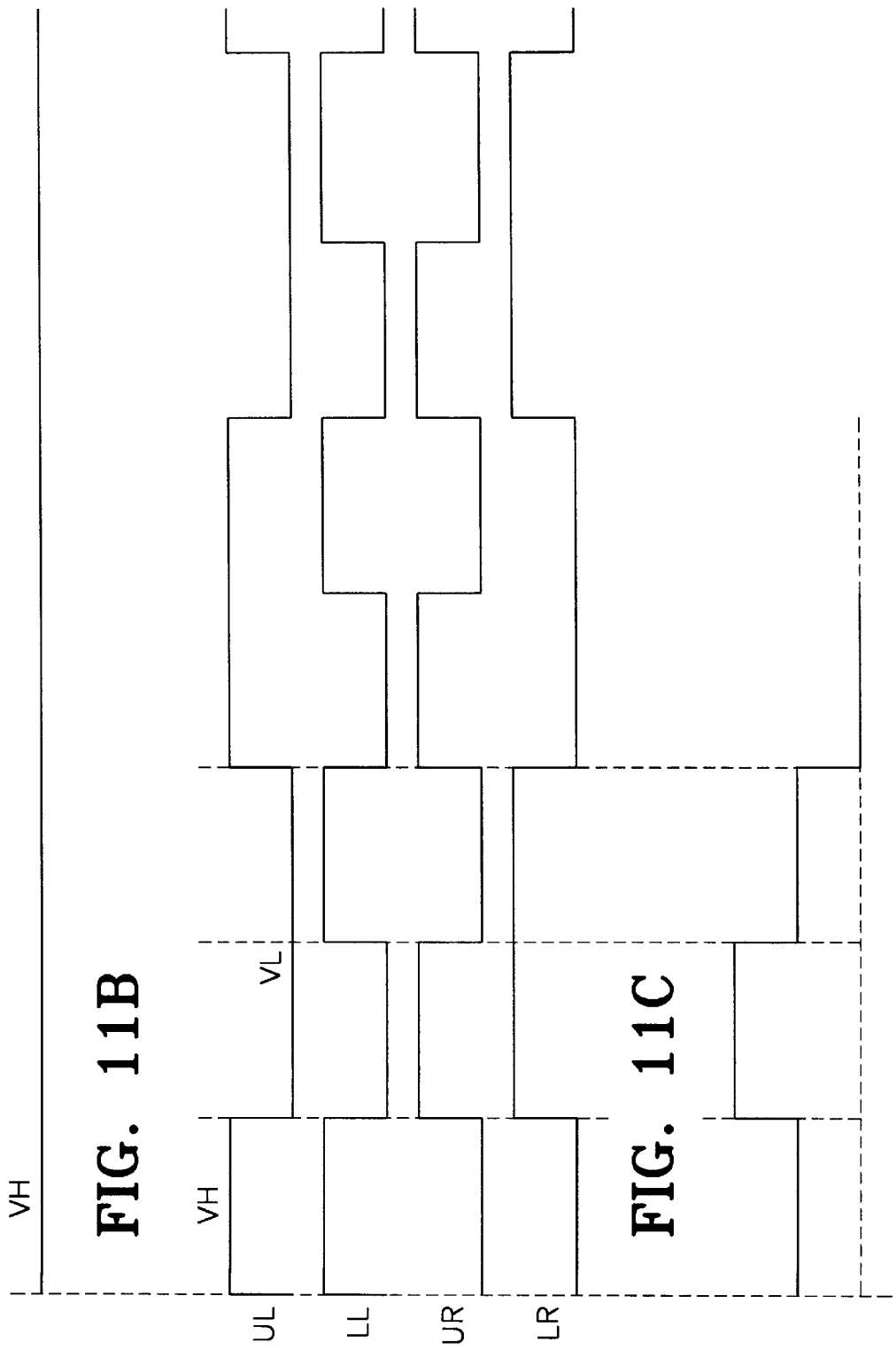
FIGS. 11A to 11C show the waveforms in the operation of each constituent element of the digitizer controller shown in FIG. 1 in the touch panel mode.

FIGS. 11A through 11C are waveforms illustrating the operation of each constituent element of the digitizer controller shown in FIG. 1 in the touch panel mode. More specifically, FIG. 11A are waveforms of the reference voltage signal generated from the reference voltage generator 12, FIG. 11B are waveforms of the panel drive control signals C_UL, C_LL, C_UR and C_LR applied to the four-channel panel driver 16, and FIG. 11C shows an example of the waveform of the touch panel signal detected by the panel 200.

Figure 12:
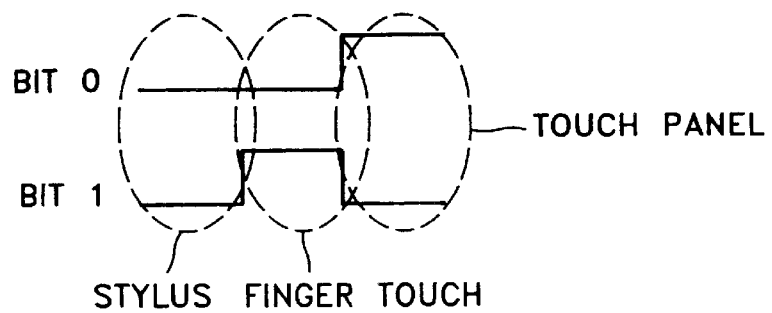
FIG. 12 is a diagram showing the format of the mode select signal shown in FIG. 1.

FIG. 12 shows a mode select signal for controlling the selection operation of the first multiplexer 14, the four-channel panel driver 16, the third multiplexer 25, the fourth multiplexer 34, the fifth multiplexer 36 and the sixth multiplexer 42. The mode selection signal is a two-bit digital signal. In FIG. 12, the mode selection operation is controlled by the combination of the bit 0 in the upper portion of the graph and the bit 1 in the lower portion. That is, "00" of the mode selection signal value represents a stylus mode, "10" thereof represents a finger touch mode, and "01" thereof represents a touch panel mode, respectively.

Figure 13:
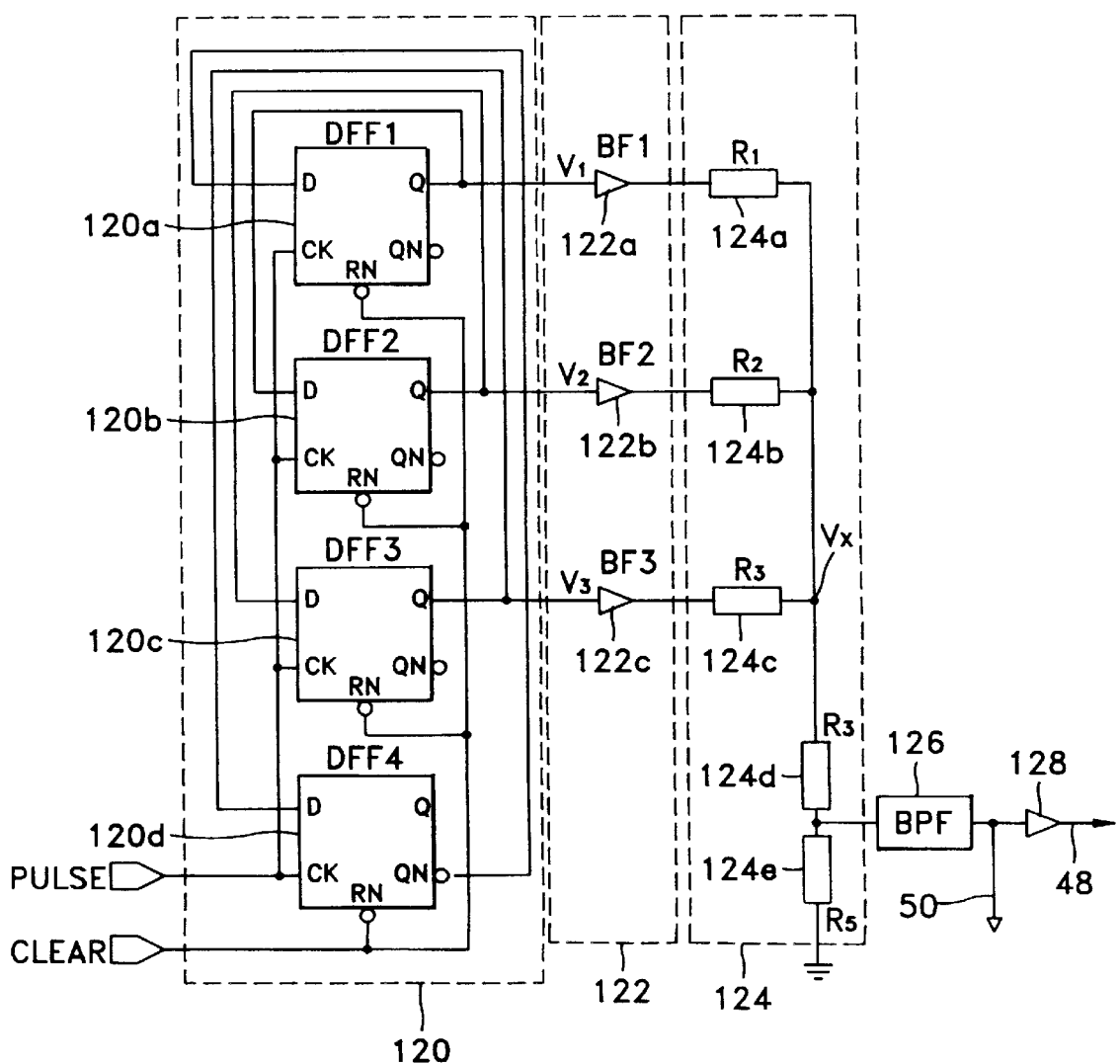
FIG. 13 is a diagram showing the panel drive signal generator shown in FIG. 1.

FIG. 13 is a detailed structural diagram of the panel drive signal generator 10 shown in FIG. 1. The structure shown in FIG. 13 which is described in Korean Patent Application No. 95-15442 by the present applicant is incorporated into the present invention.

A panel driving signal generating portion shown in FIG. 13 includes a D flip-flop portion 120, an amplifying portion 122, a ladder portion 124, a band pass filter 126, and an amplifier 128.

The D flip-flop portion 120 receives clock signals and generates (n−1) signals whose frequencies are divided into n sections (n is an integer). Here, the (n−1) frequency-divided signals are synchronized with the first to the (n−1)th clock signals of a clock signal sequence, respectively.

In a suggested embodiment, there are four cascading D flip-flops 120a–120d. That is, the non-inverted output of each previous D flip-flop is supplied as the input the following D flip-flop, the inverted output of the last D flip-flop is supplied as the input of the first D flip-flop, and three frequency-divided signals are obtained from the non-inverted outputs of the first three D flip-flops.

Here, the numbers of frequency-divided signals and corresponding D-flip-flops are related to the resolution of an intended panel driving signal. To simulate a panel driving signal in three steps, for instance, three delay signals and four D-flip-flops are required.

Here, the number of required D flip-flops, n, is the same as the number of steps in which the panel driving signal is expressed.

The amplifying portion 122 has amplifiers 122a–122c for differentially amplifying the frequency-divided signals output from the D-flip-flop portion 120.

The ladder portion 124 generates a pseudo-sinusoidal signal by adding the frequency-divided signals output from the amplifying portion 122 according to their respective resistances of resistors 124a, 124b, 124c, 124d and 124e. Here, the pseudo-sinusoidal signal indicates a signal having a waveform approximate to that of an ideal sine wave signal.

The band pass filter (BPF) 126 band pass filters the pseudo-sinusoidal signal output from the ladder portion 124, and generates the pilot signal 50 for the BPF 28 shown in FIG. 1.

The amplifier 128 generates the panel driving signal 48 to the first multiplexer 14 of FIG. 1 by amplifying a signal output from the BPF 126.

Figure 14:
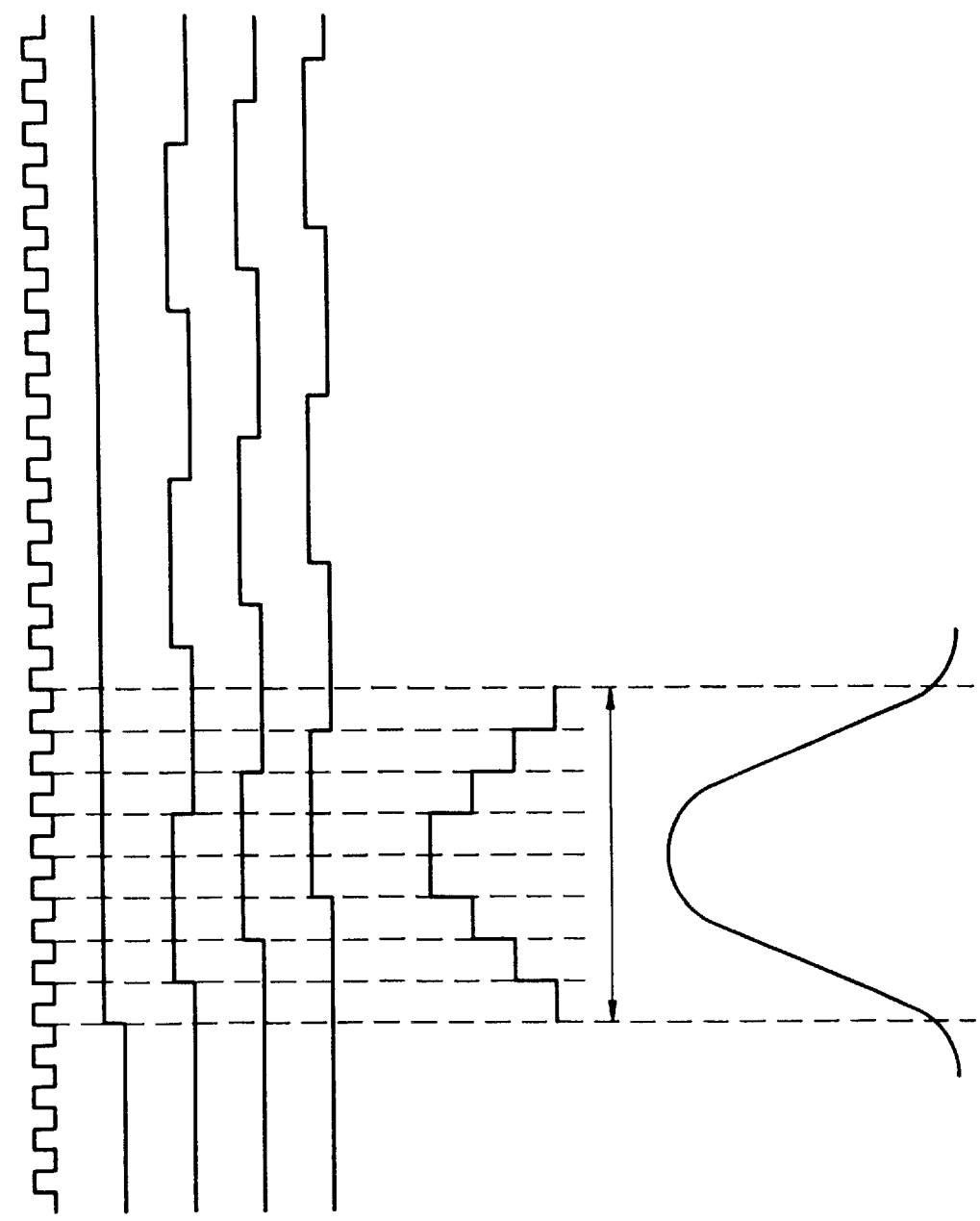
FIGS. 14A–14G show the waveforms of signals illustrating the operation of the device shown in FIG. 13.

FIGS. 14A–14G illustrate the waveforms of signals for describing the operation of the panel driving signal generating portion shown in FIG. 13, in a case of a sine wave signal represented in three steps. FIG. 14A illustrate a clock signal CLOCK, FIG. 14B illustrates a clear signal CLEAR, and FIGS. 14C–14E illustrate frequency-divided signals V1, V2, and V3, respectively. FIG. 14F illustrates the pseudo-sinusoidal signal output from the ladder portion 124, and FIG. 14G illustrates the signal output from the BPF 126.

Figure 15:
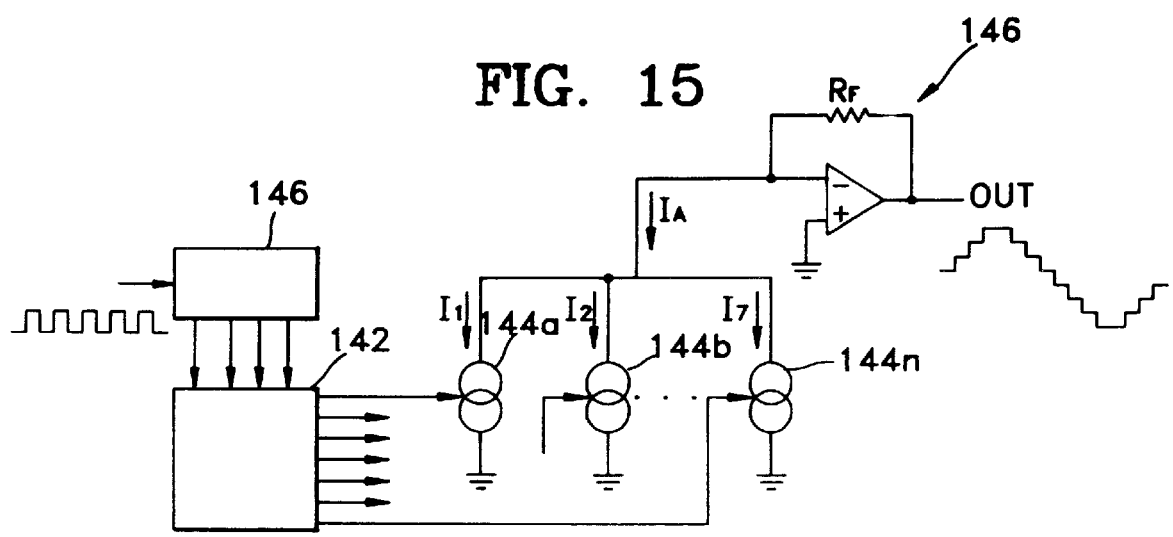
FIG. 15 is a schematic block diagram of a conventional panel driving signal generating device.

FIG. 15 schematically illustrates a conventional panel driving signal generating device. The device of FIG. 15 has a counter 140 for counting clock signals, a decoder 142 for decoding the counted signals from the counter 140 and generating a plurality of switching control signals, a plurality of current sources 144a–144n to be enabled or disenabled in response to the control signals output from the decoder 142, respectively, and an amplifying portion 146 for obtaining the sum of currents generated in the plurality of current sources 144a–144n.

The panel driving signal generating device of FIG. 15 is disadvantaged in that it has overly large circuits, high power dissipation, and difficulty in circuit integration. Also, since the counted value of the clock signals must inconveniently be decoded, as many current sources as there are decoded bits are required.

In contrast, due to the advantage of not requiring a counter, a decoder, and current sources, the panel driving signal generating circuit of the present invention shown in FIG. 13 is simpler and exhibits lower power consumption, thus being suitable for a sine wave generating circuit realized in the form of an integrated circuits.

Figure 16:
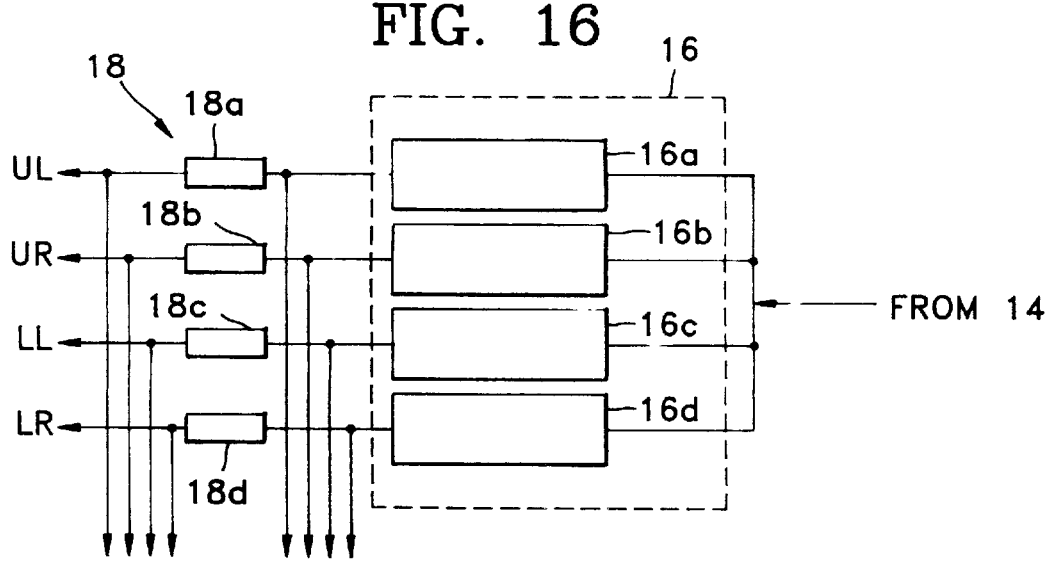
FIG. 16 is a detailed schematic block diagram of the 4-channel panel driving portion shown in FIG. 1.

FIG. 16 is a detailed schematic block diagram of the 4-channel panel driving portion and the current-voltage converting portion shown in FIG. 1. The 4-channel panel driving portion 16 includes four driving blocks 16a–16d for generating channel driving signals UL, UR, LL, and LR, respectively, to the four corners of the panel 200. The respective driving blocks 16a–16d receive panel driving control signals C_UL, C_UR, C_LL, and C_LR and a signal output from the first multiplexer 14, and outputs the channel driving signals UL, UR, LL, and LR to the four corners of the panel 200. The channel driving signals UL, UR, LL, and LR output from the 4-channel panel driving portion 16 are supplied to the four corners of the panel 200 via the current-voltage converting portion 18.

The current-voltage converting portion 18 has four variable resistors 18a–18d for current-voltage converting the channel driving signals UL, UR, LL, and LR provided to the four corners. In a finger touch mode, by varying resistance, the resistors 18a–18d can adjust the sensitivity.

Figure 17:
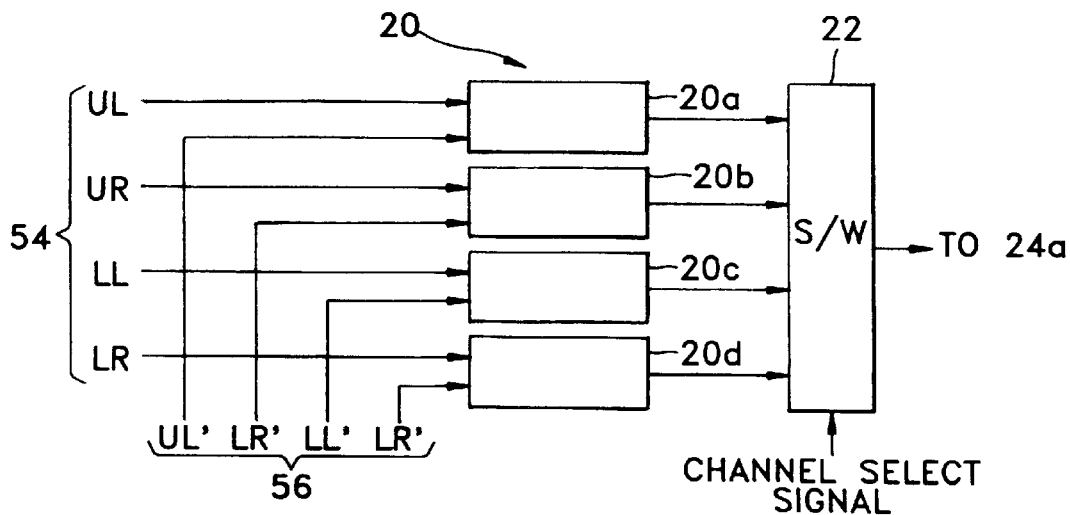
FIG. 17 is a detailed schematic block diagram of the differential amplifying portion shown in FIG. 1.

FIG. 17 schematically illustrates the differential amplifying portion 20 and the second multiplexer 22 shown in FIG. 1, in detail. The differential amplifying portion 20 has four differential amplifiers 20a–20d for receiving the channel driving signals 54, i.e., UL, UR, LL, and LR output from the 4-channel panel driving portion 16 and current-voltage converted channel driving signals 56 supplied from the current-voltage converting portion 18, and generating their difference signals 57.

Figure 18:
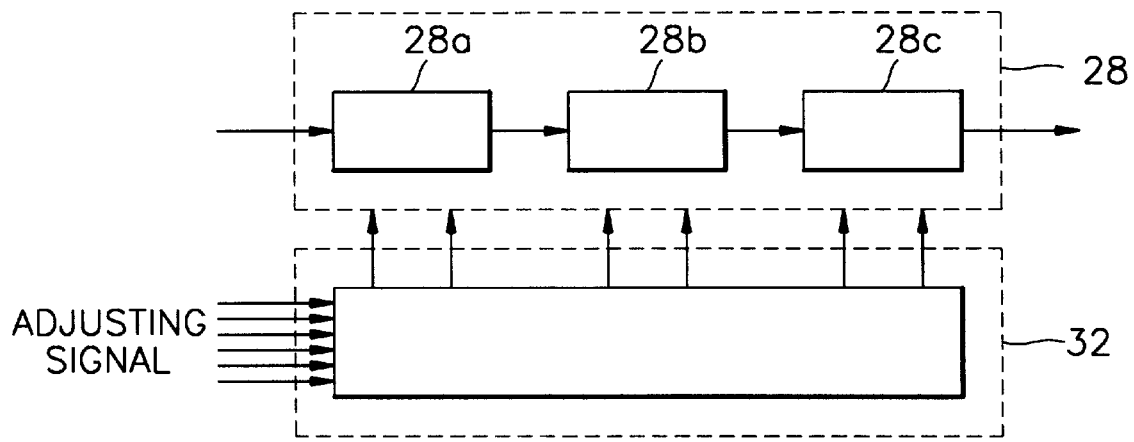
FIG. 18 is a detailed schematic block diagram of the band pass filter and the digital-to-analog converter shown in FIG. 1.

FIG. 18 is a detailed schematic block diagram of the BPF 28 and the digital-to-analog converter 32 shown in FIG. 1. In FIG. 18, the BPF 28 is provided with a low-pass notch (LPN) filter 28a, a high-pass notch (HPN) filter 28b, and a BPF 28c.

Figure 19A:
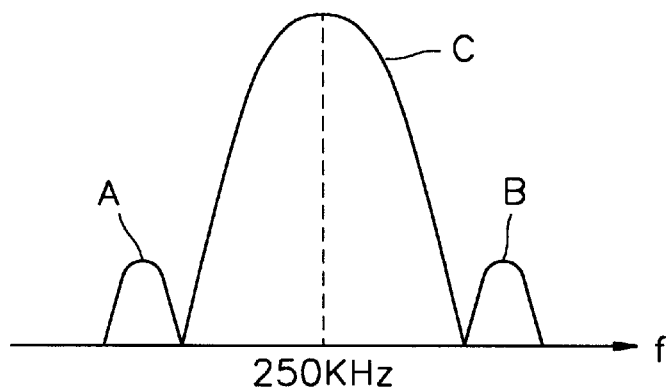
FIGS. 19A and 19B are graphs showing the frequency characteristics of the band pass filter shown in FIG. 18.

FIG. 19A illustrates normal frequency characteristics of the BPF shown in FIG. 18. Here, reference characters A, B, and C indicate the frequency characteristic of the LPN filter 28a, the HPN filter 28b, and the BPF 28c, respectively.

The central frequency of the BPF having the frequency characteristics indicated by A, B, and C should be adjusted to the frequency of the panel driving signal 48.

Figure 19B:
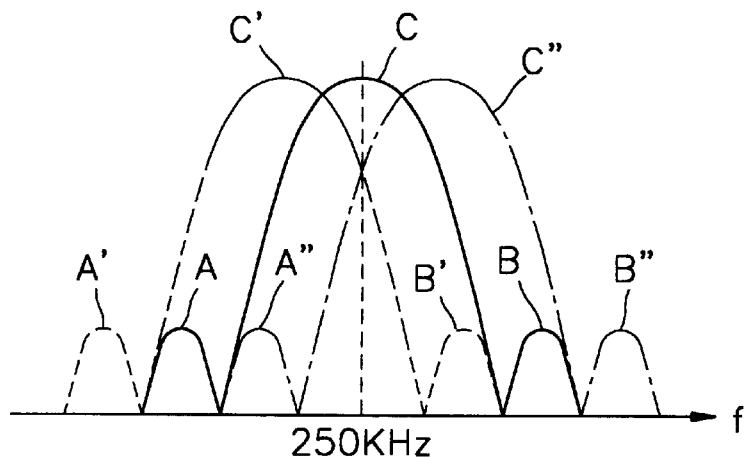

In a process for manufacturing the digitizer controller of the present invention, the characteristics of the filters 28a, 28b, and 28c may drift depending on the distribution of process parameters. For example, they may drift up and down desirable frequency characteristic curves, as shown in FIG. 19B as portions A', B', and C' indicated by dotted lines or portions A", B", and C" indicated by one-dot-dashed lines. -Such drifts deteriorate the reliability of the digitizer controller, for example, performance degrades in terms of noise elimination and amplification degree. To prevent this problem, a special approach is taken in the present invention.

A method for adjusting the frequency characteristics of a BPF according to the present invention is implemented as follows.

First, a pilot signal having the same frequency, in a practical sense, as that of a panel driving signal is input to the BPF, and a signal for adjusting the frequency characteristics of the BPF is continuously varied within a predetermined range.

Then, the value of a signal for adjusting the frequency characteristics of a detected signal which has the largest magnitude is determined by comparing the magnitudes of signals from the BPF.

Finally, the frequency characteristics of the BPF are determined by the determined frequency-characteristic adjusting signal.

The digital-to-analog converter 32 generates analog signals for adjusting the frequency characteristics of the filters 28a, 28b, and 28c shown in FIG. 18.

The digital-to-analog signal converter 32 converts an adjusting signal output from a microprocessor into an analog signal and outputs the analog signal to the LPN filter 28a, the HPN filter 28b, and the BPF 28c.

Figure 20:
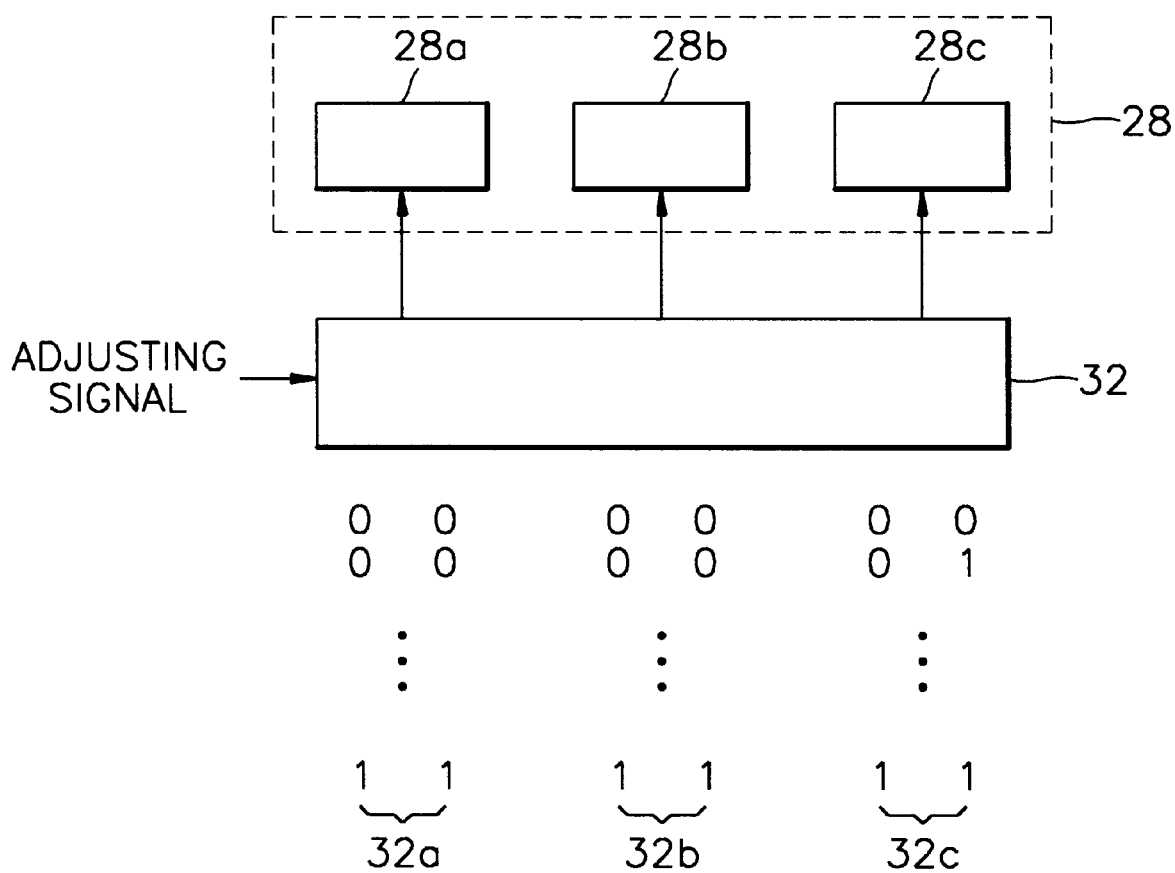
FIG. 20 illustrates the format of an adjusting signal for adjusting the frequency characteristics of the band pass filter shown in FIG. 18.

FIG. 20 illustrates the format of the signal for automatically adjusting frequency characteristics output from the microprocessor to the digital-to-analog converter 32. Bit groups 32a, 32b, and 32c move the central frequencies of the LPN filter 28a, the HPN filter 28b, and the BPF 28c.

Figure 21:
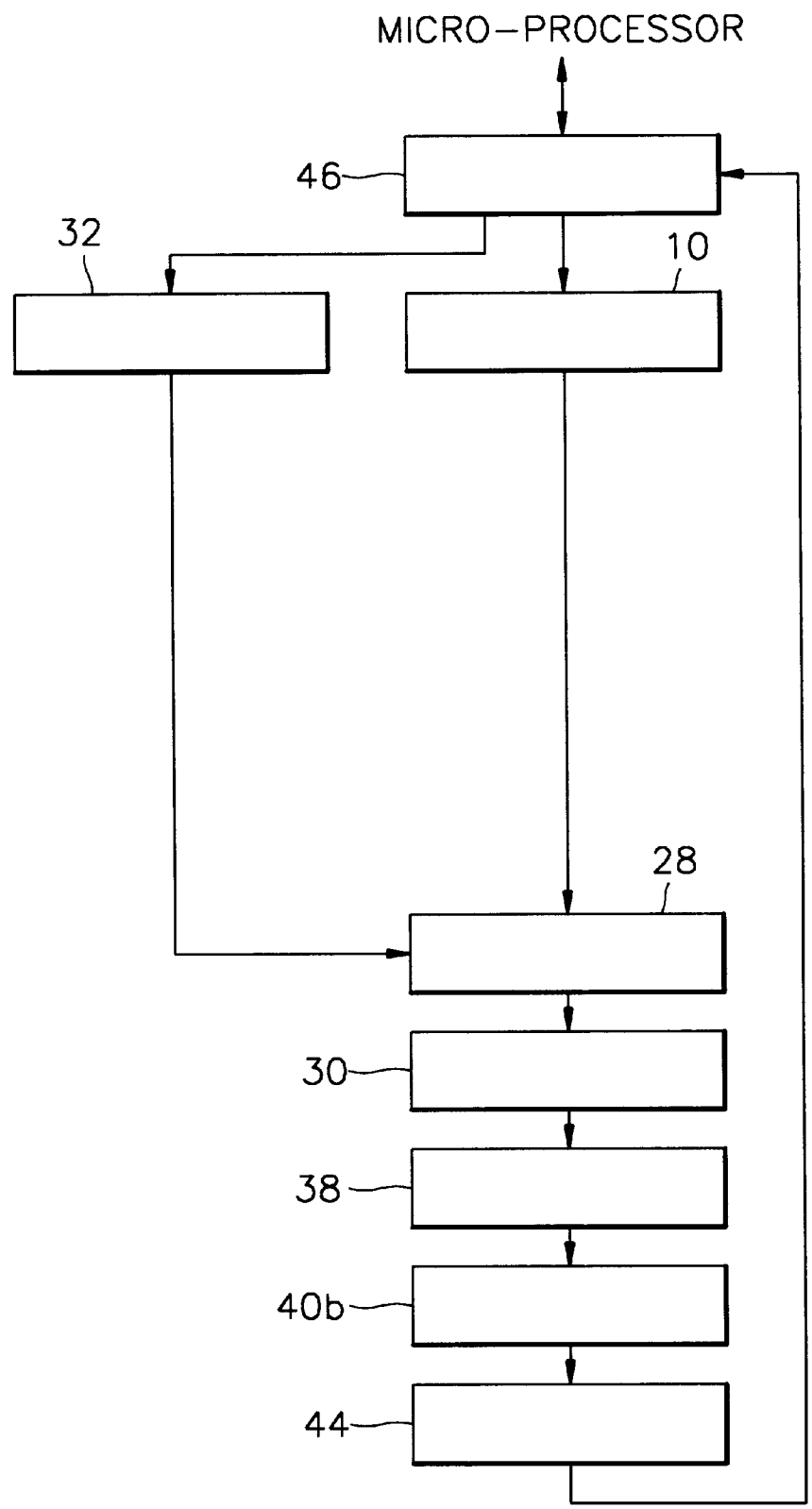
FIG. 21 illustrates signal flow in an automatic frequency-characteristic adjusting mode.

FIG. 21 illustrates the flow of a signal in an automatic frequency-characteristic adjusting mode. Here, the automatic frequency-characteristic adjusting mode can be implemented at moment power is initially applied to the digitizer controller.

In the automatic frequency-characteristic adjusting mode, the third multiplexer 26 selects the pilot signal 50 output from the panel drive signal generator 10 in response to a mode select signal. The microprocessor supplies the automatic frequency-characteristic adjusting signal to the digital-to-analog converter 32.

The BPF 28 band-pass filters the pilot signal 50 by frequency characteristics adjusted by an analog signal output from the digital-to-analog converter 32. The rectifier 30 receives the filtered pilot signal 50 and rectifies it.

The signal 66 output from the rectifier 30 is supplied to the low pass filter 38 via the fifth multiplexer 36.

The low pass filter 38 low-pass filters the signal 66 output from the rectifier 30 and outputs the filtered signal to the second DC amplifier 40b.

The second DC amplifier 40b amplifies the signal 68 output from the low pass filter 38 and outputs the amplified signal to the analog-to-digital converter 44 via the sixth multiplexer 42.

The analog-to-digital converter 44 converts the signal 70 output from the sixth multiplexer 42 into a digital signal and outputs the digital signal to the interface portion 46.

The interface portion 46 outputs the converted digital signal to the microprocessor via the bus 102.

The microprocessor sequentially provides adjusting signals varying in a predetermined range to the digital-to-analog converter 32 and compares the results. An adjusting signal having the largest resulting value is determined as a result of the comparison and output as a finally determined frequency-characteristic adjusting signal to the interface portion 46. A data latch (not shown) in the interface portion 46 latches the adjusting signal and outputs the latched signal to the digital-to-analog converter 32. The digital-to-analog converter 32 determines the frequency characteristics of the BPF according to the adjusting signal latched by the latch.

The automatically frequency-characteristic adjusting method as described above is advantageous in that, for example, the frequency characteristics of the BPF 28 may undesirably drift by the distribution of process parameters, or the sensitivity of a device may vary due to a variation in the frequencies of the panel driving signal 48 generated in the panel drive signal generator 10 and the pilot signal 50, in other cases.

However, since the panel driving signal 48 and the pilot signal 50 have the same frequency, adjustment of the frequency characteristics of the BPF 28 by the pilot signal 50 enables the central frequency of the BPF 28 to be accurately adjusted to the frequency of the panel driving signal 48.

Figure 22:
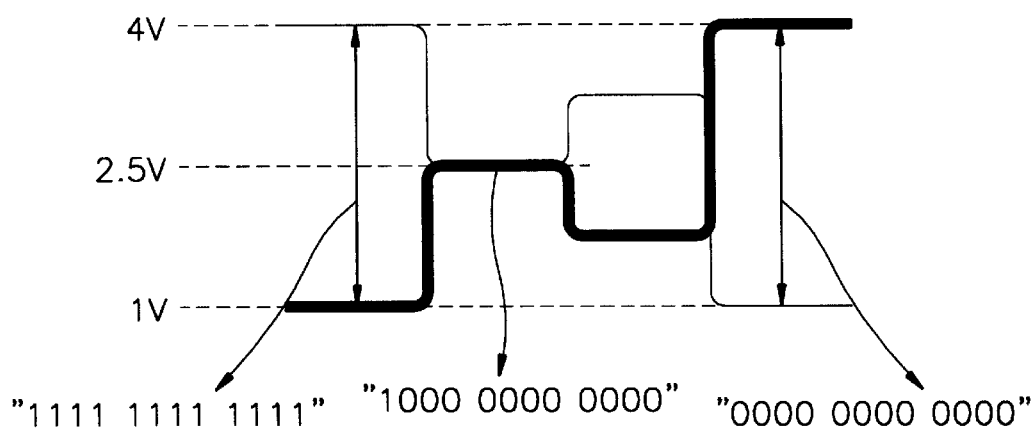
FIG. 22 illustrates the conversion in the analog-to-digital converter shown in FIG. 1.

The analog-to-digital converter 44 receives complementary dual inputs and digitally converts their difference. That is, the analog-to-digital converter 44 receives complementary signals and digitally converts their difference to a predetermined resolution. In the embodiment of the present invention, as shown in FIG. 22, the range of dual input is 1–4V (the center voltage is 2.5V), and the resolution is $2^{12}$. In the embodiment of the present invention, the analog-to-digital converter 44 outputs twelve bits of "1111 1111 1111" in the case of the dual input difference being 4V, "1000 0000 0000" in the case of 0V, and "0000 0000 0000" in the case of –4V.

Figure 23:
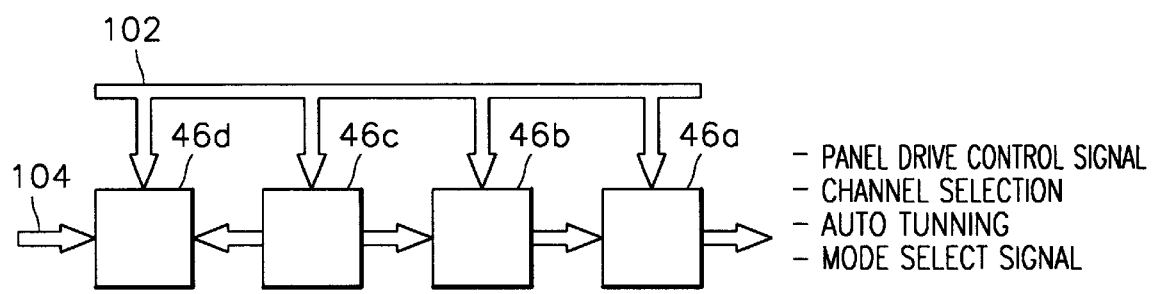
FIG. 23 is a detailed schematic block diagram of the interface portion shown in FIG. 1.

FIG. 23 is a detailed schematic block diagram of the interface portion shown in FIG. 1. The device shown in FIG. 23 is incorporated in the present invention and described in Korea Patent Application No. 95-21316 by the present applicant entitled *System Control Signal Transmitting Circuit*.

The device of FIG. 23 has a command decoder 46a, a data latch 46b, an address decoder 46c, and a data buffer 46d.

The microprocessor (not shown) supplies a system write control signal WRITE, a system read control signal READ, a clock signal CLOCK, a power save enable signal PSEN, an address signal ADDRESS, an automatic frequency-characteristic adjusting signal, panel driving control signals C_UL, C_UR, C_LL, and C_LR, a channel select signal, an analog-to-digital converter controlling signal, and instruction data to the interface portion 46 via the bus 102. The interface portion 46 outputs digital data expressed in terms of coordinates, which was converted by the analog-to-digital converter 44 and the resulting value of the BPF corresponding to the frequency-characteristic adjusting signal to the microprocessor.

The data latch 46b and the data buffer 46d have unique addresses which can be assigned by the microprocessor.

The address decoder 46c receives an address signal from the microprocessor and generates a signal for activating the data buffer 46d or the data latch 46b.

When the data latch 46b is activated by the address decoder 46c, it latches a control instruction received from the microprocessor.

The command decoder 46a receives the control instruction latched in the data latch 46b, and generates the mode select signal, the panel driving control signals C_UL, C_UR, C_LL, and C_LR, the channel select signal, and the automatic frequency-characteristic adjusting signal, which are needed for controlling the digitizer controller shown in FIG. 1.

In the embodiment shown in FIG. 1, the panel driving control signals C_UL, C_UR, C_LL, and C_LR are generated in the microprocessor, and output to the 4-channel panel driving portion 16 via the interface portion 46. The microprocessor generates the panel driving control signals C_UL, C_UR, C_LL, and C_LR by a software by using data stored in a memory (not shown) such as a ROM. The panel driving signals can be obtained in a later-described another panel driving control signal generating device.

When the data buffer 46d is activated by the address decoder 46c, it receives digitally converted data from the analog-to-digital converter 44, or outputs stored coordinate values to the microprocessor via the bus 102.

The input and output operations of the interface portion 46, especially, the data latch 46b or the data buffer 46d, are controlled by the system write control signal and the system read control signal supplied via the bus 102.

When the system write control signal is activated, the data latch 46b of the interface portion 46 receives instruction data from the microprocessor, and the instruction decoder 46a decodes the instruction data, thereby controlling the operation of the digitizer controller.

When the system read control signal is activated, the data buffer 46d of the interface portion 46 receives a digital signal from the analog-to-digital converter 44. The digital data received in the data buffer 46d is transmitted to the microprocessor. Here, the conversion of the analog-to-digital converter 44 is performed by synchronization with the system read control signal.

Figure 24:
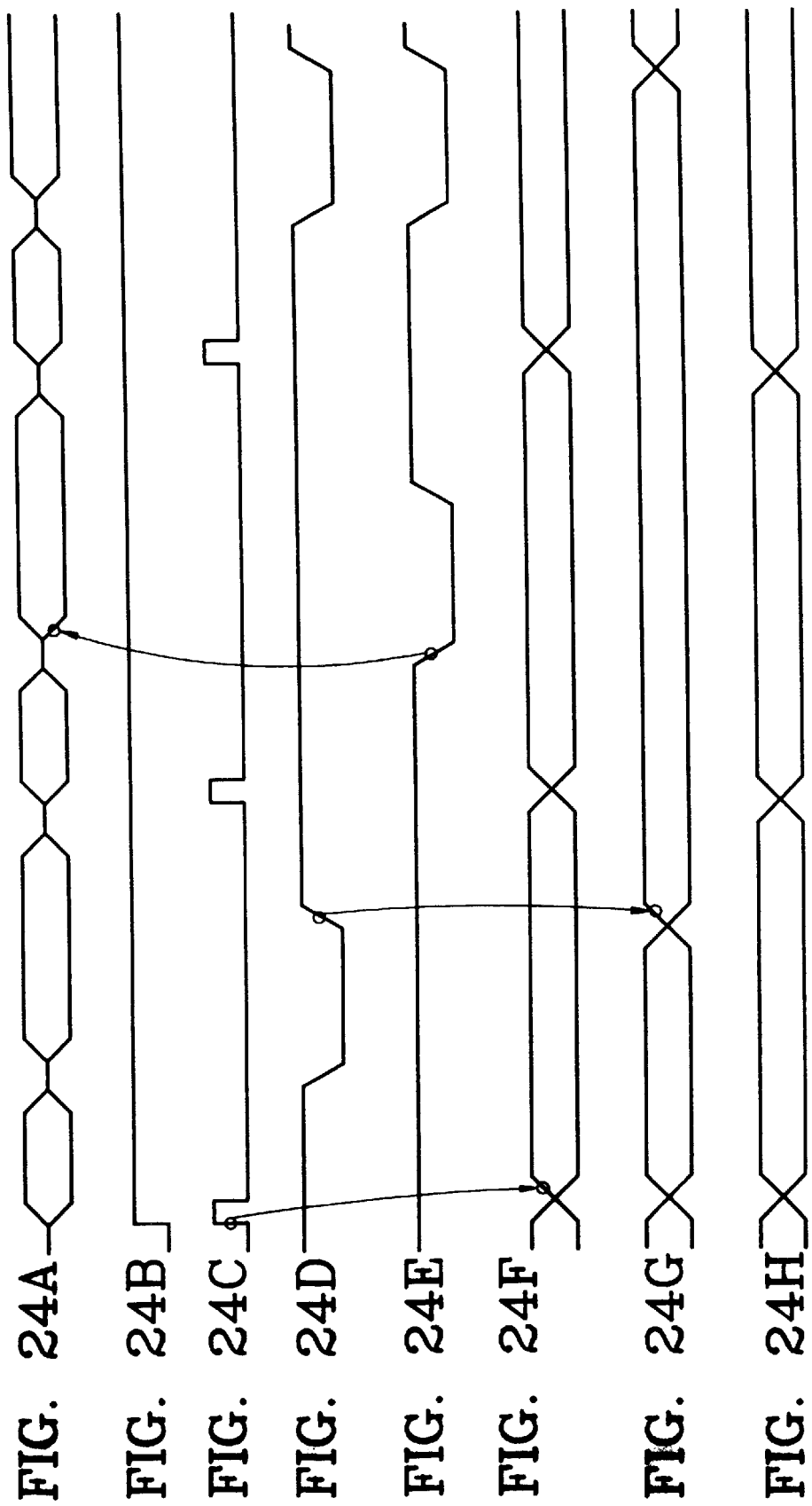
FIGS. 24A–24H are timing diagrams of signals, for showing the operation of the device shown in FIG. 23.

FIGS. 24A–24H are timing diagrams of signals, for showing the operations of the interface portions shown in FIG. 23. FIG. 24A illustrates the procedure of the address signal ADDRESS loaded on the bus 102, and a control instruction and adjusting signal COMMAND and ADC, FIG. 24B illustrates the power save enable signal PSEN, FIG. 24C illustrates an address latch enable signal ALE, FIG. 24D illustrates the system write control signal WRITE, FIG. 24E illustrates the system read control signal READ, FIG. 24F illustrates the state of an address latched by the address decoder 46c, FIG. 24G illustrates transmission of system control signals output from the instruction decoder 46a, and FIG. 24H illustrates digital data converted in the analog-to-digital converter 44.

Referring to FIGS. 24A–24H, the addresses indicative of the data latch 46b and the data buffer 46c, the control instruction, and the automatic frequency-characteristic adjusting signal are transmitted via the bus 102.

When the power save enable signal PSEN and the address latch enable signal ALE are high, the address decoder 46c receives an address transmitted via the bus 102, decodes the address, and activates the data latch 46b or the data buffer 46d.

In the figures, ADDRESS1 and ADDRESS2 indicate the addresses of the data latch 46b and the data buffer, respectively.

When the address signal represents ADDRESS1 and the system write control signal is low, the data latch 46b receives the control instruction transmitted via the bus 102, and the instruction decoder 46a decodes the control instruction and outputs various system control signals.

When the address represents ADDRESS2 and the system read control signal is low, the data buffer 46d receives digital data from the analog-to-digital converter 44 and transmits the digital data to the microprocessor. In practice, the data latch 46b is constituted by, a plurality of latches (not shown). Each inter-latch has a unique address for a direct access of the microprocessor. The addresses of the data latch 46b and the interlatches are hierarchically arranged. Such latches can be provided, for example, for the mode select signal, the panel driving control signals C_UL, C_UR, C_LL, and C_LR, the frequency-characteristics adjusting signal, and the channel select signal, respectively.

Figure 25:
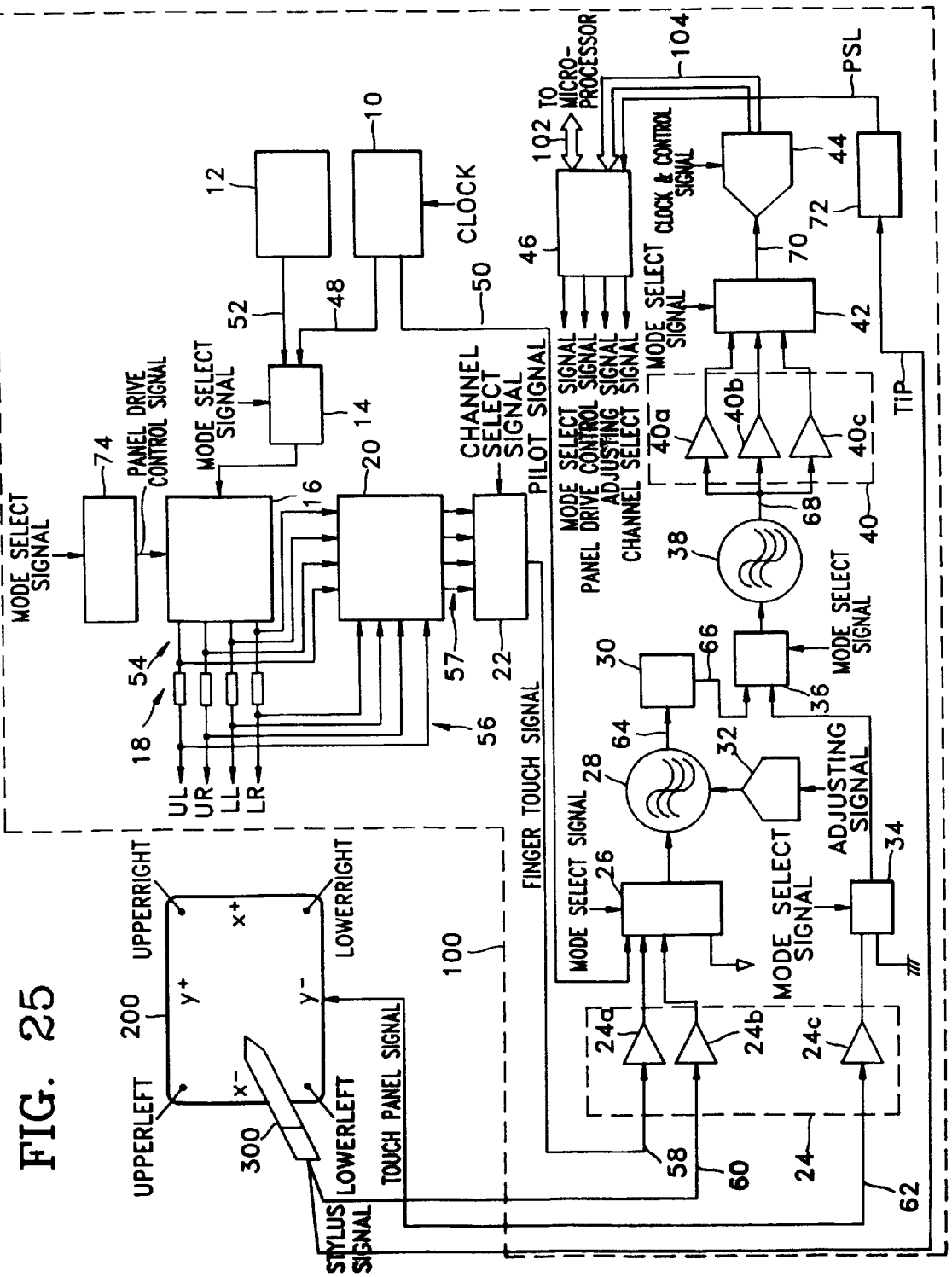
FIG. 25 is a block diagram of another embodiment of the digitizer controller according to the present invention.

FIG. 25 illustrates another embodiment of the digitizer controller 500 according to the present invention. The device of FIG. 25 is the same as that of FIG. 1, except that a panel drive control signal generating portion 74 and a power saving control circuit 72 are further provided. Thus, the description of like elements will be omitted.

The digitizer controller 100 shown in FIG. 1 is controlled by the power save enable signal output from the microprocessor. Thus, the microprocessor determines by a software whether a power save mode is set. This imposes constraints on the microprocessor and requires a signal transmission line for transmitting the power save enable signal between the microprocessor and the digitizer controller 100.

On the other hand, to circumvent the above problem, in the digitizer controller 500 shown in FIG. 25, the power saving control circuit 72 is provided to determine whether a power save mode is set according to a tip signal TIP generated in the stylus 300. Then, when the power saving control circuit 72 generates a power slip signal, the interface portion 46 sets the digitizer controller in the power save mode.

Figure 26:
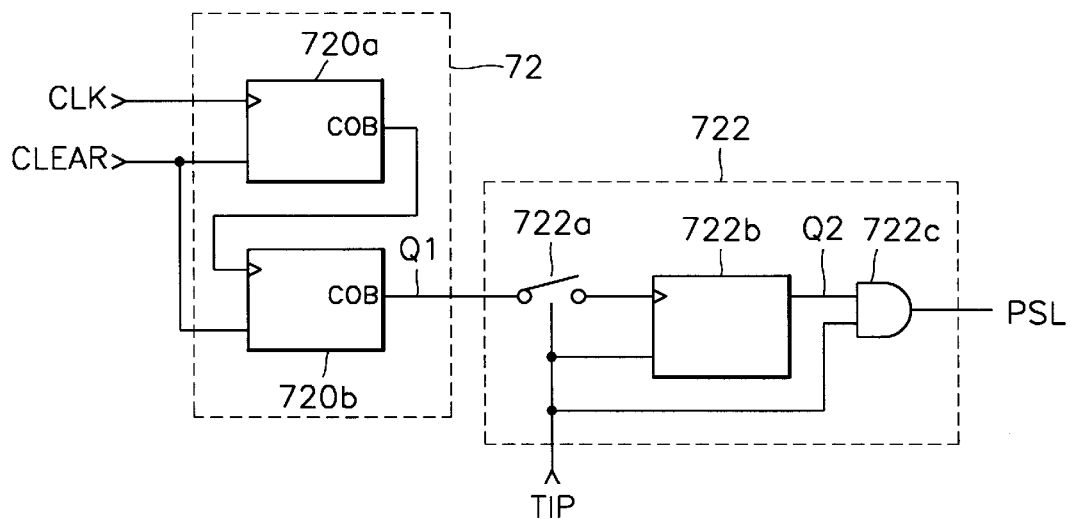
FIG. 26 is a detailed schematic block diagram of the power save device shown in FIG. 25.

FIG. 26 is a detailed schematic block diagram of the power saving control circuit 72 of FIG. 25. The structure shown in FIG. 26 which is described in Korean Patent Application No. 95-56423 by the present applicant is incorporated into the present invention.

The power saving control circuit 72 has a counting portion 720 for counting clock signals and outputting a pulse signal having a predetermined period, and a power slip signal generating portion 722 for generating the power slip signal PSL for controlling power consumption when the panel is idle for longer than a predetermined time.

The counting portion 720 includes a first counter 720a for counting clock signal and a second counter 720b for counting the output of the first counter.

The power slip signal generating portion 722 includes a switch 722a for controlling the transmission of the pulse signal output from the second counter 720b in response to the TIP signal from the stylus 300, a third counter 722b for counting the outputs of the switch 722a, and an AND gate 722c for performing a logic multiplication on the output of the third counter 722b and the signal TIP. Here, the signal TIP is generated in the stylus 300. When the point of the stylus 300 contacts the panel, the signal TIP becomes high, otherwise, the signal is low.

Figure 27A:
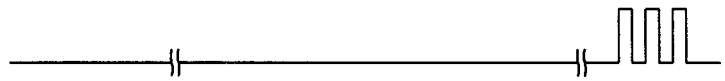
FIGS. 27A–28D illustrate the waveforms of signals for showing the operation of the power save device shown in FIG. 26.
Figure 27B:
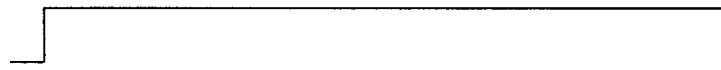
Figure 27C:
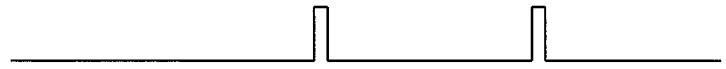

FIGS. 27A through 28D illustrate the waveforms of signals in the operation of the power save device shown in FIG. 26. FIG. 27A illustrates the waveform of the clock signal, FIG. 27B illustrates the waveform of a clear signal, and FIG. 27C illustrates the output of the second counter 720b.

The first and second counters 720a and 720b count the clock signal shown in FIG. 27A, and the second counter 720b outputs a first pulse signal Q1 having a predetermined period. The first pulse signal Q1 is output from a carry-of-bit (COB) terminal provided to the counter.

In the suggested embodiment, the clock signal is 2 MHz, the first counter 720a is a duodecimal counter, and the second counter 720b is a quaternary counter. Therefore, the frequency of the first pulse signal Q1 output from the second counter 720b is 244 Hz.

Figure 28A:
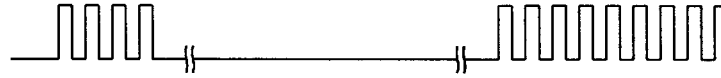
Figure 28B:
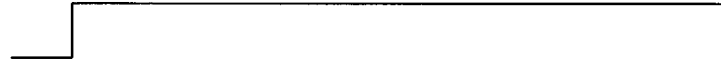
Figure 28C:
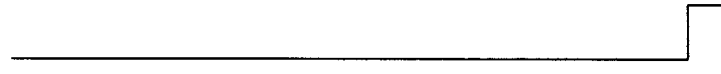
Figure 28D:
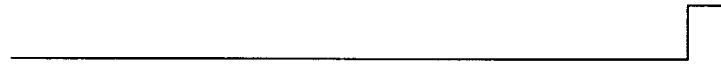

FIG. 28A illustrates the waveform of the pulse signal Q1 output from the second counter 720b, FIG. 28B illustrates the waveform of the signal TIP output from the stylus 300, FIG. 28C illustrates the waveform of a pulse signal Q2 output from the third counter 722b, and FIG. 28D illustrates the waveform of the power slip signal PSL output from the AND gate 722d.

As shown in FIGS. 28A–28D, when the signal TIP is high, the third counter 722b counts the first pulse signal Q1, and outputs the second pulse signal Q2 of a high level when the counting is completed. When the signal TIP and the second pulse signal Q2 are both high, the power slip signal PSL output from the AND gate 722c becomes high.

This power slip signal PSL is provided via the interface portion 46. When the power slip signal PSL is generated, the interface portion 46 sets the digitizer controller 500 shown in FIG. 25 in the power save mode.

The digitizer controller 100 of FIG. 1 is controlled by the panel driving control signals C_UL, C_UR, C_LL, and C_LR output from the microprocessor. Hence, the microprocessor generates the panel driving control signals C_UL, C_UR, C_LL, and C_LR depending on the mode by a memory such as a ROM or by a software. This imposes constraints on the microprocessor, and requires a 4-bit signal transmission line for transmitting the panel driving control signals C_UL, C_UR, C_LL, and C_LR between the microprocessor and the digitizer controller 100.

On the other hand, the digitizer controller of FIG. 25 has a block 74 for generating the panel driving control signals C_UL, C_UR, C_LL and C_LR required according to the mode select signal output from the microprocessor, thus overcoming the above problem.

Figure 29:
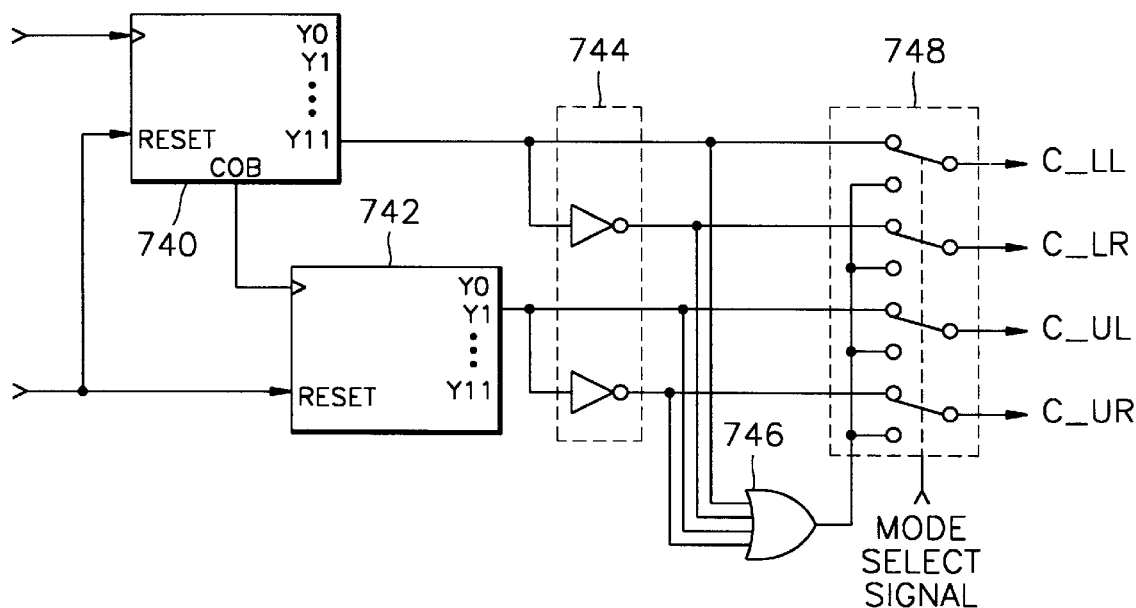
FIG. 29 is a detailed schematic block diagram of the panel driving control signal generating portion shown in FIG. 25.

FIG. 29 is a detailed schematic block diagram of the panel driving control signal generating circuit shown in FIG. 25. The device of FIG. 29 is incorporated in the present invention, a part of which is described in Korean Patent Application No. 95-69704 entitled *Panel Driving Circuit for Pen Digitizer.*

The device of FIG. 29 has a first counter 740, a second counter 742, an inverting portion 744, an OR gate 746, and a signal selecting portion 748.

The first counter 740 duodecimally counts a clock signal.

Here, the period of a first count signal output from the first counter 740 corresponds to that of the panel driving control signals C_LL and C_UR for controlling the channel driving signals LL and UR provided to the lower left and the upper right portions of the panel 200.

The second counter 742 binarily counts the first count signal output from the first counter 740. Here, the period of a second count signal corresponds to that of the panel driving control signals C_UL and C_LR for controlling the channel driving signals UL and LR provided to the upper left and the lower right portions of the panel 200.

The inverter portion 744 has two inverters 744a and 744b for inverting the first count signal output from the first counter 740 and the second count signal output from the second counter 742.

The OR gate 746 generates a logic addition signal of the first count signal output from the first counter 740, the second count signal output from the second counter 742, an inverted first count signal output from the first inverter 746a, and an inverted second count signal output from the second inverter 746b.

The signal selecting portion 748 generates the panel driving control signals C_UL, C_UR, C_LL, and C_LR corresponding to modes in response to the mode select signal. For example, when the mode select signal represents a stylus mode or a touch panel mode, the signal selecting portion 748 selectively outputs the first count signal output from the first counter 740, the second count signal output from the second counter 742, the inverted first count signal output from the first inverter 746a, and the inverted second count signal output from the second inverter 746b. If the mode select signal represents the finger touch, mode, the signal selecting portion 748 selectively outputs the signals supplied from the OR gate 746.

Figure 30:
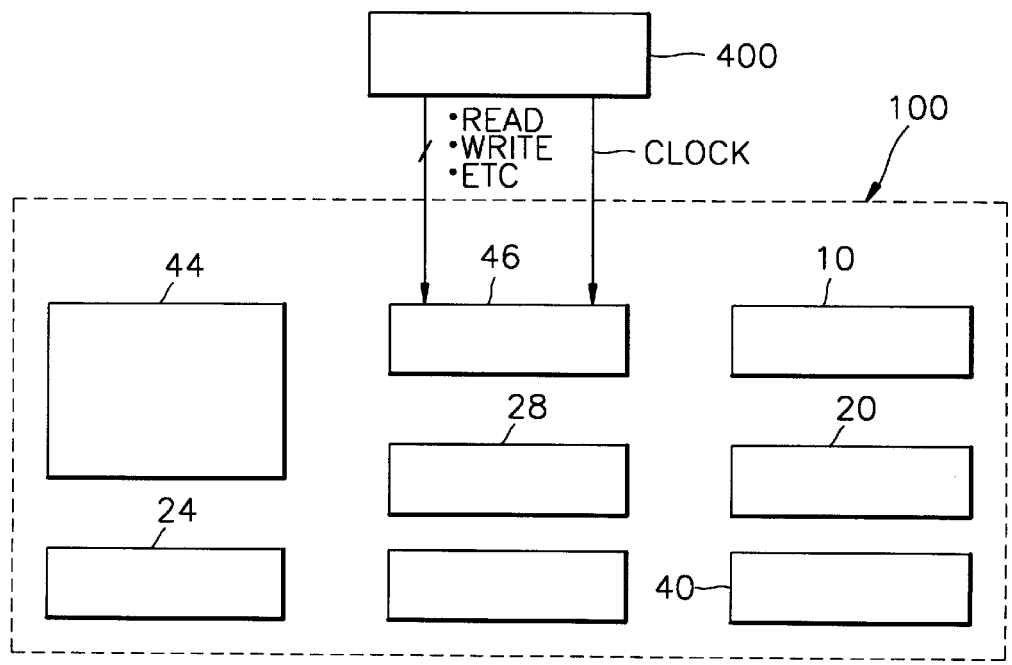
FIG. 30 is a layout view of integrated circuits for realizing the device of FIG. 1.

FIG. 30 illustrates a layout of integrated circuits for realizing the device shown in FIG. 1. In the suggested embodiment, the microprocessor 400 has a capacity of 8 bits. Data is transmitted between the microprocessor and the interface portion 46 via the 8-bit bus. There are signal lines for transmitting the system write control signal, the system read control signal, the address latch enable signal, the clock signal, the power save enable signal, and the panel driving control signals C_UL, C_UR, C_LL, and C_LR.

As described above, the digitizer controller has the following advantages: (1) it can operate in any of a stylus mode, a finger touch mode, and a touch panel mode; (2) since it can be realized in integrated circuits, power dissipation is small; and (3) it can automatically adjust the frequency characteristics of a BPF, thereby increasing the reliability and enabling the realization of an automatic multi-functional digitizer system.

INDUSTRIAL APPLICABILITY

The digitizer controller of the present invention can be used in graphics or CAD applications a touch screen display, a personal digital assistance or an electric organizer. The digitizer controller can be implemented into a semiconductor integrated circuit.

What is claimed is:

1. A digitizer controller (100) for applying a 4-channel driving signal for driving the four corners of a panel (200) in response to a panel driving control signal befitting a stylus type and a touch panel type digitizer and outputting coordinate data by recognizing a contact position by a stylus or a finger, said digitizer controller comprising:

a panel drive signal generator (10) for receiving a clock signal having a predetermined first frequency and generating a panel drive signal having a predetermined second frequency and required in stylus and finger touch modes;

a 4-channel driving portion (16) for receiving said panel drive signal provided from said panel drive signal generator (10) and generating a channel driving signal which is provided to each corner of said panel (200) in response to said panel driving control signal according to an operation mode;

a current-voltage converter (18) for detecting a change in current in or out of each corner of said panel (200);

a differential amplifier (20) for generating a differential signal of four channels corresponding to a differential component between the output of said current-voltage converter (18) and the channel driving signal provided from said 4-channel driving portion (16) in said finger touch mode;

a second multiplexer (22) for sequentially selecting the four-channel differential signal of the output from said differential amplifier (20) to output the selected signal as a finger touch signal;

a third multiplexer (26) for selectively outputting one of the finger touch signal output from said second multiplexer (22) and a stylus signal output from a stylus in response to a mode selection signal indicating the stylus or the finger touch mode;

a fourth multiplexer (34) for selectively outputting one of a predetermined second reference voltage and the touch panel signal output from said panel (200) in response to the mode selection signal;

a band pass filter (28) for filtering the frequency component of the panel drive signal from the output of said third multiplexer (26);

a rectifier (30) for rectifying the output of said band pass filter (28);

a fifth multiplexer (36) for selectively outputting one of the outputs of said rectifier 30 and said fourth multiplexer (34) in response to the mode selection signal;

a low pass filter (38) for detecting a substantial direct current component from the output of said fifth multiplexer (36);

an analog-to-digital converter (44) for converting the output of said low pass filter (38) into a digital signal in synchronization with the panel driving control signal to output as a coordinates signal; and an interface (46) for receiving control commands provided from a microprocessor, generating the mode selection signal indicating the stylus, the finger touch or the touch panel mode by interpreting the received control command and the panel driving control signal corresponding to the selected mode, and transmitting the coordinates signal provided from said analog-to-digital converter 44 to the microprocessor.

2. The digitizer controller of claim 1, wherein said differential amplifier (20) is provided with four channel driving blocks (20a–20b), each amplifying the difference of one of the channel driving signals and one of the current-voltage converted channel driving signals.

3. The digitizer controller of claim 1, further comprising a preamplifier (24) for amplifying the finger touch and the stylus signals by a predetermined gain, respectively, to provide to one of said third multiplexer (26) and said fourth multiplexer (34).

4. The digitizer controller of claim 1, further comprising:

a direct current amplifier (40) having at least two direct current amplifiers (40b and 40c) for amplifying the output of said low pass filter (38) by a separate gain according to the operation mode; and a sixth multiplexer (42) for selecting one of the outputs of said direct current amplifiers (40b and 40c) in response to the mode selection signal to provide the selected output to said analog-to-digital converter (44).

5. The digitizer controller of claim 1, further comprising a digital-to-analog converter (32) for digital-to-analog converting the control signal provided from said microprocessor to apply the converted control signal as a frequency characteristic control signal of said band pass filter (28).

6. The digitizer controller of claim 1, wherein said panel drive signal generator (10) further generates a pilot signal having a substantially same frequency as that of the panel drive signal which is provided to said band pass filter (28) during automatic frequency characteristic control.

7. The digitizer controller of claim 1, wherein said current-voltage converter (18) is configured with variable resistors so that sensitivity of the current-voltage conversion can be adjusted.

8. The digitizer controller of claim 1, wherein in said low pas filter (38) removal of noise components and conversion to direct current is easily achieved since the bandwidth thereof is narrow.

9. The digitizer controller of claim 1, wherein said interface (46) comprises:
   a data latch (46b) for latching the control command provided from said microprocessor;
   a data buffer (46d) for inputting a digitally converted coordinates value provided from said analog-to-digital converter (44) and outputting the input coordinates value to said microprocessor;
   a command decoder (46a) for receiving the control command provided from said data latch (46b) and generating the mode selection signal, the panel driving control signal, the channel selection signal and the frequency characteristic control signal necessary for control of said digitizer controller; and
   an address decoder (46c) for receiving an address signal provided from said microprocessor and generating signals for activating said data latch (46b) and the data buffer (46d).

10. The digitizer controller of claim 1, wherein said panel driving signal generator (10) comprises:
   a D-flip flop (120) for receiving a clock signal and generating a (n−1)th signal divided by n, wherein n is an integer, wherein the (n−1) divided signal is generated, each being synchronized from the first clock signal to the (n−1)th clock signal in a sequential clock signal string of the corresponding number to division ratio n;
   a ladder portion (124) for generating a pseudo sinusoidal signal by weight-calculating the (n−1) division signals according to a predetermined resistance value; and
   a band pass filter (28) for generating the panel drive signal which is a substantial sine wave by band-pass-filtering the pseudo sinusoidal signal provided from said ladder portion (124).

11. The digitizer controller of claim 1, wherein said panel driving control signal generator (74) comprises:
   a first counter (740) for generating a first count signal by counting the clock signal at a predetermined first counting ratio;
   a second counter (742) for binary-counting the first count signal provided from said first counter (740) to output the binary-counted signal as a second signal;
   an inverting portion (744) having two inverters (744a and 744b) for respectively inverting the first and second count signals each provided from said first and second counters (740 and 742);
   an OR gate (746) for OR-ing the first and second count signals; and
   a signal selecting portion (748) for receiving the first and second count signals respectively provided from said first and second counters (740 and 742), the inverted first and second count signals provided from said inverting portion (744) and a signal output from said OR gate (746) and generating a panel driving control signal corresponding to each mode in response to the mode selection signal,
   wherein said signal selecting portion (748) outputs the first and second count signals respectively provided from said first and second counters (740 and 742), the inverted first and second count signals provided from said inverting portion (744) and a signal output from said OR gate (746) in the stylus and the touch panel modes and the signal provided from said OR gate (746) in the finger touch mode.

12. The digitizer controller of claim 1, further comprising:
   a counting portion (720) for counting the clock signal having a predetermined period at a predetermined first count ratio to output a first pulse signal;
   a counter (722b) for counting the first pulse signal output from said counting portion at a predetermined second count ratio, by starting the counting operation according to a tip signal of the stylus; and
   a power slip signal generator (722) for determining whether the idle status of the stylus continues over a predetermined time by AND-ing a second pulse signal output from said counter (722b) and the tip signal of the stylus and generating a power slip signal for controlling power consumption if the idle status continues over the predetermined time period,
   wherein said interface (46) enters a power saving mode in response to the power slip signal provided from said power slip signal generator (722).

13. An integrated semiconductor circuit comprising the digitizer controller claimed in claim 1.

14. A digitizer controller which applies a 4-channel driving signal for 1driving the four corners of a panel (200) in response to a panel driving control signal befitting a stylus type, a touch panel type and a finger touch type and outputs coordinated data by recognizing a contact position by a stylus, a pen or a finger, said digitizer controller comprising:
   a panel drive signal generator (10) for receiving a clock signal having a predetermined a first frequency and generating a panel drive signal having a predetermined second frequency and required in stylus and finger touch modes;
   a reference voltage generator (12) for generating a reference voltage signal having a predetermined reference level required in a touch panel mode;
   a first multiplexer (14) for selectively outputting one of the reference voltage signal provided from said reference voltage generator (12) and the panel drive signal provided from said panel drive signal generator (10) in response to a mode selection signal indicating the stylus, finger touch or touch panel mode;
   a 4-channel driving portion (16) for receiving the output of said first multiplexer (14) and generating a channel driving signal which is provided to each corner of said panel (200) in response to said panel drive control signal according to an operation mode;
   a current-voltage converter (18) for detecting change of current in or out of each corner of said panel (200);
   a differential amplifier (20) for generating a differential signal of four channels corresponding to differential component between the output of said current-voltage converter (18) and the channel driving signal provided from said 4-channel driving portion (16) in said finger touch mode;
   a second multiplexer (22) for sequentially selecting the four-channel differential signal of output from said differential amplifier (20) to output the selected signal as a finger touch signal;
   a third multiplexer (26) for selectively outputting one of the finger touch signal output from said second multiplexer (22) and a stylus signal output from a stylus in response to the mode selection signal;

a fourth multiplexer (34) for selectively outputting one of a predetermined reference voltage and the touch panel signal output from said panel (200) in response to the mode selection signal;

a band pass filter (28) for filtering the frequency component of the panel drive signal from the output of said third multiplexer (26);

a rectifier (30) for rectifying the output of said band pass filter (28);

a fifth multiplexer (36) for selectively outputting one of the outputs of said rectifier 30 and said fourth multiplexer (34) in response to the mode selection signal;

a low pass filter (38) for detecting substantial direct current component from the output of said fifth multiplexer (36);

an analog-to-digital converter (44) for digital-converting the output of said low pass filter (38) into a digital signal in synchronization with the panel driving control signal to output as a coordinates signal; and an interface (46) for receiving a control command provided from a microprocessor, generating the mode selection signal indicating the stylus, the finger touch or the touch panel mode by interpreting the received control command and the panel driving control signal corresponding to the selected mode, and transmitting the coordinates signal provided from said analog-to-digital converter 44 to the microprocessor.

15. The digitizer controller of claim 14, wherein said differential amplifier (20) is provided with a plurality of channel driving blocks corresponding to the number of the channel driving signals, each amplifying the difference of one of the channel driving signals and one of the current-voltage converted channel driving signals.

16. The digitizer controller of claim 14, further comprising pre-amplifier (24) for amplifying the finger touch signal, the stylus signal and the touch panel signal at a predetermined amplification rate, respectively, to provide to wither said third multiplexer (26) and said fourth multiplexer (34).

17. The digitizer controller of claim 14, further comprising:

a direct current amplifier (40) having three direct current amplifiers for amplifying the output of said low pass filter (38) at separate gains according to the operation mode, and a sixth multiplexer (42) for selecting one of outputs of said direct current amplifiers in response to the mode selection to provided the selected output to said analog-to-digital converter (44).

18. The digitizer controller of claim 14, further comprising a digital-to-analog converter (32) for converting the digital control signal provided from said microprocessor into an analog signal to apply the converted control signal as a frequency characteristic control signal of said band pass filter (28).

19. The digitizer controller of claim 14, wherein said panel drive signal generator (74) further generates a pilot signal having the substantially same frequency as that of the panel drive signal which is provided to said band pass filter (28) during automatic frequency characteristic control.

20. The digitizer controller of claim 14, wherein said current-voltage converter (18) is configured with variable resistors so that sensitivity of the current-voltage conversion can be adjusted.

21. The digitizer controller of claim 14, wherein in said low pass filter (38) removal of noise components and conversion to direct current is easily achieved since bandwidth thereof is narrow.

22. The digitizer controller of claim 14, wherein said panel drive signal generator (74) comprises:

a D-flip flop (120) for receiving a clock signa and generating a (n−1)th signal divided by n, wherein n is an integer, wherein the (n−1) divided signal is generated, each being synchronized from the first clock signal to the (n−1)th clock signal in a sequential clock signal string of the corresponding number to division ratio n;

a ladder portion (124) for generating pseudo sinusoidal signal by weight-calculating the (n−1) division signals according to a predetermined resistance value; and a band pass filter (28) for generating the panel drive signal which is a substantial sine wave by band-pass-filtering the pseudo sinusoidal signal provided from said ladder portion (124).

23. An integrated semiconductor circuit comprising the digital controller claimed in claim 14.

24. A method for driving a panel befitting a finger touch type digitizer comprising the steps of:

applying channel driving signals having the same potential to each corner of said panel (200);

detecting the change in current generated by the contact of a finger on said panel (200) in or out of each corner of said panel (200), and converting the detected change in current changing into a change in voltage;

detecting differential signals corresponding to the difference of the current-to-voltage converted signal and the channel driving signal;

sequentially selecting the differential signals at a predetermined period and time-division multiplexing the selected differential signals; and determining the contact position of the finger according to the size of the multiplex differential signal.

25. A driving apparatus of a finger touch type digitizer comprising:

a panel drive signal generator (10) for generating a panel drive signal required in a finger touch mode;

a 4-channel driving portion (16) for receiving the panel drive signal and generating a 4-channel driving signal of substantially the same electric potential which is provided to the four corners of a panel (200);

a current-to-voltage converter (18), interposed between said 4-channel panel driving portion (16) and said panel (200), for detecting a change in current in or out of each corner of said panel (200) when the finger contacts said panel (200);

a differential amplifier (20) for generating a difference of the 4-channel driving signal and the current-to-voltage conversion value from said current-to-voltage converter (18);

a multiplexer (22) for sequentially selecting the four-channel differential signal of the output from said differential amplifier (20) at a predetermined period to output the selected signal;

a band pass filter (28) for detecting a frequency component of the panel drive signal from the output of said multiplexer (22);

a low pass filter (38) for extracting a substantial direct current component from the output of said band pass filter (28); and an analog-to-digital converter (44) for converting the output of said low pass filter (38) into a digitizer signal in synchronization with the selected period of said multiplexer (22).

26. A method of adjusting the frequency characteristic of a band pass filter (28) for band-pass-filtering a frequency component of a panel drive signal from a finger touch signal provided from a panel (200) or a stylus signal provided from a stylus in a digitizer controller befitting a stylus type and a finger touch type, said method comprising the steps of:

inputting a pilot signal having substantially the same frequency as the panel drive signal to said band pass filter (28) and continuously converting within a predetermined range an adjusting signal for adjusting the frequency characteristic of said band pass filter (28);

comparing the signal from said band pass filter (28) and determining a value of the adjustment signal having the maximum amplitude of the detected signal; and setting a frequency characteristic of said band pass filter (28) according to the determined adjustment signal.

27. An apparatus for adjusting the frequency characteristic of a band pass filter (28) for band-pass-filtering a frequency component of a panel drive signal from a finger touch signal provided from a panel (200) or a stylus signal provided from a stylus in a digitizer controller befitting a stylus type and a finger touch type digitizer, said apparatus comprising:

a panel drive signal generator (10) for generating a pilot signal having substantially the same frequency as that of a panel drive signal to provide to said band pass filter (28);

a digital-to-analog converter (32) for converting an analog adjustment signal applied from a microprocessor into an digitizer signal and applying the converted signal as a signal for adjusting the frequency characteristic of said band pass filter (28);

an analog-to-digital converter (44) for detecting the amplitude of a signal from said band pass filter (28);

a microprocessor for generating the adjustment signal changing within a predetermined range to change the frequency characteristic of said band pass filter (28) to provide the generated adjustment signal to said digital-to-analog converter (32), determining an adjustment signal corresponding to a signal having the maximum amplitude among the band-pass-filtered signals from the changing adjustment signal within the predetermined range, and providing the determined adjustment signal as a frequency characteristic adjustment signal of said band pass filter (28).

28. An interface (46) for transmitting control commands generated from a microprocessor to peripheral devices and controlling the transmission of the data provided from the peripheral devices to said microprocessor, said interface comprising:

a data latch (46b) for latching the control command provided from said microprocessor;

a data buffer (46d) for inputting the data provided from said peripheral devices and outputting the input data to said microprocessor;

a command decoder (46a) for receiving the control command provided from said data latch (46b) and generating various control signals necessary for control of said peripheral devices; and an address decoder (46c) for receiving an address signal provided from said microprocessor and generating signals for activating said data latch (46b) and the data buffer (46d).

29. An apparatus for generating a sinusoidal signal comprising:

a D flip-flop (120) for receiving a clock signal and generating a (n−1)th signal divided by n, wherein n is an integer, and wherein the (n−1) divided signal is generated, each being synchronized from the first clock signal to the (n−1)th clock signal in a sequential clock signal string of the corresponding number to division ratio n;

a ladder portion (124) for generating a pseudo sinusoidal signal by weight-calculating the (n−1) division signals according to a predetermined resistance value; and a band pass filter (28) for generating the panel drive signal which is a substantial sine wave by band-pass-filtering the pseudo sinusoidal signal provided from said ladder portion (124).

30. A panel driving control signal generator for controlling the generation of a 4-channel driving signal for driving the four corners of a panel (200) befitting a stylus type, a touch panel type and a finger touch type digitizer, said generator comprising:

a first counter (740) for generating a first count signal made by dividing a clock signal at a predetermined first count ratio;

a first counter (740) for generating a first count signal by counting the clock signal at a predetermined first counting ratio;

a second counter (742) for binary-counting the first count signal provided from said first counter (740) to output the binary-counted signal as a second signal;

an inverting portion (744) having two inverters (744a and 744b) for respectively inverting the first and second count signals each provided from said first and second counters (740 and 742);

an OR gate (746) for OR-ing the first and second count signals; and a signal selecting portion (748) for receiving the first and second count signals respectively provided from said first and second counters (740 and 742), the inverted first and second count signals provided from said inverting portion (744) and a signal output from said OR gate (746) and generating a panel driving control signal corresponding to each mode in response to the mode selection signal, wherein said signal selecting portion (748) outputs the first and second count signals respectively provided from said first and second counters (740 and 742), the inverted first and second count signals provided from said inverting portion (744) and a signal output from said OR gate (746) in the stylus and the touch panel modes and the signal provided from said OR gate (746) in the finger touch mode.

31. A power saving apparatus which prevents power consumption of a digitizer controller in a state when a stylus is not used in a stylus type digitizer, said apparatus comprising:

a counting portion (720) for counting the clock signal having a predetermined period at a predetermined first count ratio to output a first pulse signal;

a counter (722b) for counting the first pulse signal output from said counting portion at a predetermined second count ratio, by starting counting operation according to a tip signal of the stylus; and a power slip signal generator (722) for determining whether the idle status of the stylus continues over a predetermined time period by AND-ing a second pulse signal output from said counter (722*b*) and the tip signal of the stylus and generating a power slip signal for controlling power consumption if the idle status continues over the predetermined time period, wherein said interface (46) enters a power saving mode in response to the power slip signal provided from said power slip signal generator (722).

\* \* \* \* \*

UNITED STATES PATENT AND TRADEMARK OFFICE
CERTIFICATE OF CORRECTION

PATENT NO.    : 6,043,810                                    Page 1 of 1
DATED         : March 28, 2000
INVENTOR(S)   : Do-youn Kim and Byoung-kwon An It is certified that error appears in the above-identified patent and that said Letters Patent is hereby corrected as shown below:

Column 3,
Line 43, "of applying" should read -- of: applying --.

Column 8,
Line 58, "AID" should read -- A/D --.

Column 10,
Line 41, "AID" should read -- A/D --.

Column 16,
Line 6, "-Such" should read -- Such --.

Column 19,
Line 5, "by, a" should read -- by a --.

Column 21,
Line 15, "touch, mode," should read --touch mode, --.

Column 24,
Line 29, "for l driving" should read -- for driving --.

Signed and Sealed this

Thirty-first Day of December, 2002

JAMES E. ROGAN
*Director of the United States Patent and Trademark Office*